United States Patent
Sandmann

[19]

[11] Patent Number: 6,155,389
[45] Date of Patent: *Dec. 5, 2000

[54] BRAKE BEAM

[75] Inventor: Michael R. Sandmann, North Tonawanda, N.Y.

[73] Assignee: Buffalo Brake Beam Company, Lackawanna, N.Y.

[*] Notice: This patent is subject to a terminal disclaimer.

[21] Appl. No.: 09/185,272

[22] Filed: Nov. 3, 1998

Related U.S. Application Data

[63] Continuation-in-part of application No. 09/157,821, Sep. 21, 1998, which is a continuation-in-part of application No. 08/715,619, Sep. 13, 1996, Pat. No. 5,810,124.

[51] Int. Cl.⁷ .................................................... B61H 13/36
[52] U.S. Cl. .......................................................... 188/226.1
[58] Field of Search ........................... 188/226.1, 225.6, 188/223.1, 228.6, 219.1, 233.3

[56] References Cited

U.S. PATENT DOCUMENTS

| | | | |
|---|---|---|---|
| 2,702,614 | 2/1955 | Spaeth | 188/223.1 |
| 2,722,291 | 11/1955 | Welp | 188/223.1 |
| 2,753,960 | 7/1956 | Stevens | 188/223.1 |
| 4,830,148 | 5/1989 | Hart | 188/223.1 |

*Primary Examiner*—Matthew C. Graham
*Assistant Examiner*—C. T. Bartz
*Attorney, Agent, or Firm*—Howard J. Greenwald

[57] ABSTRACT

A brake beam assembly containing a compression member, a tension member, a strut connected to the tension member and the compression member, and two brake heads with recesses. The ends of the compression member and the tension member are disposed within the recesses of the brake heads together with at least one fastener per recess; and each of the fasteners is substantially perpendicular to the tension and compression members.

6 Claims, 23 Drawing Sheets

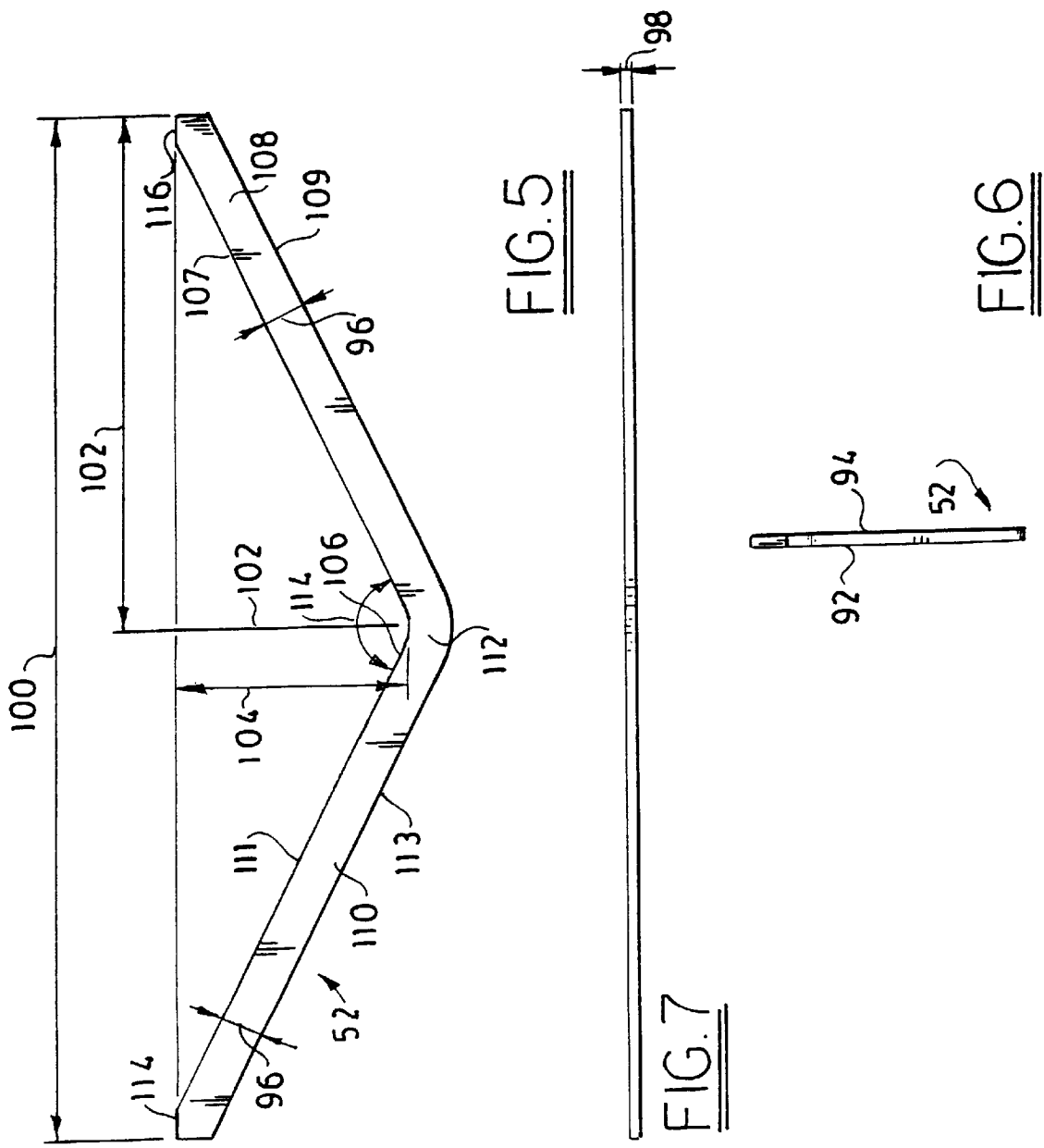

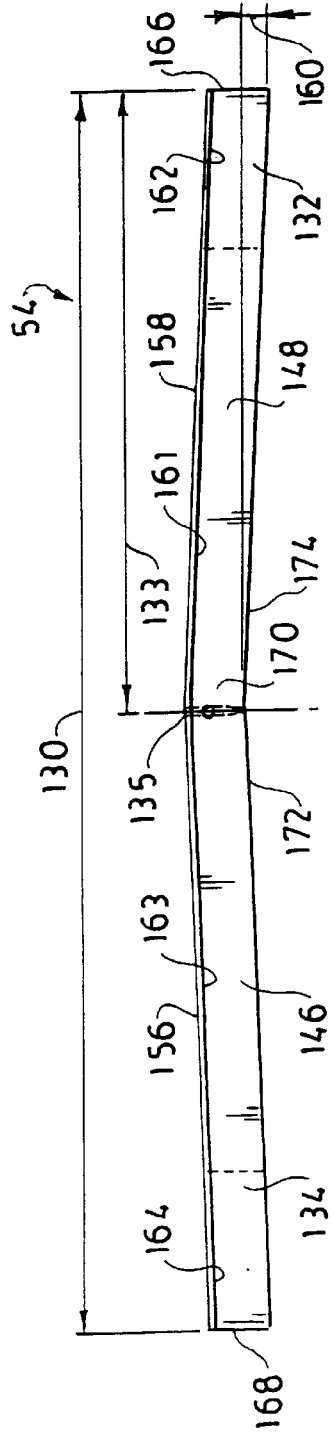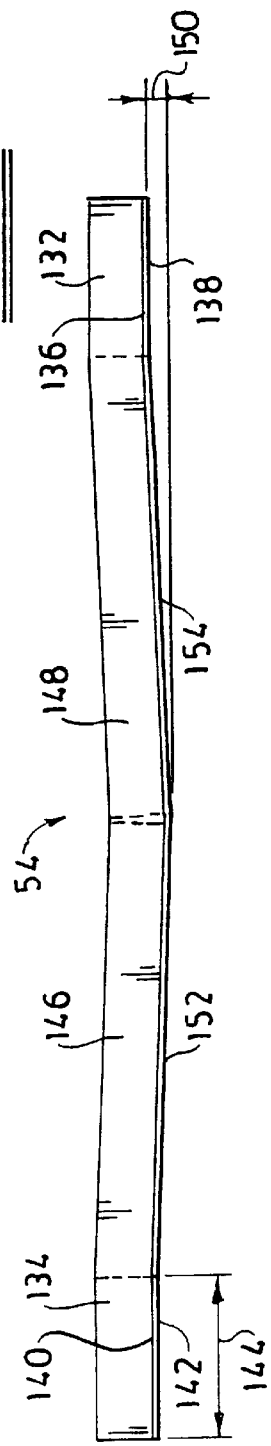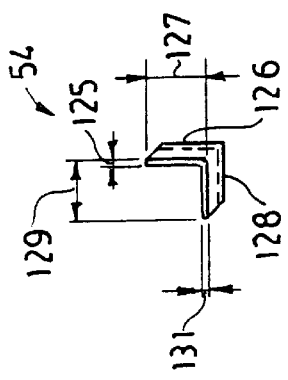

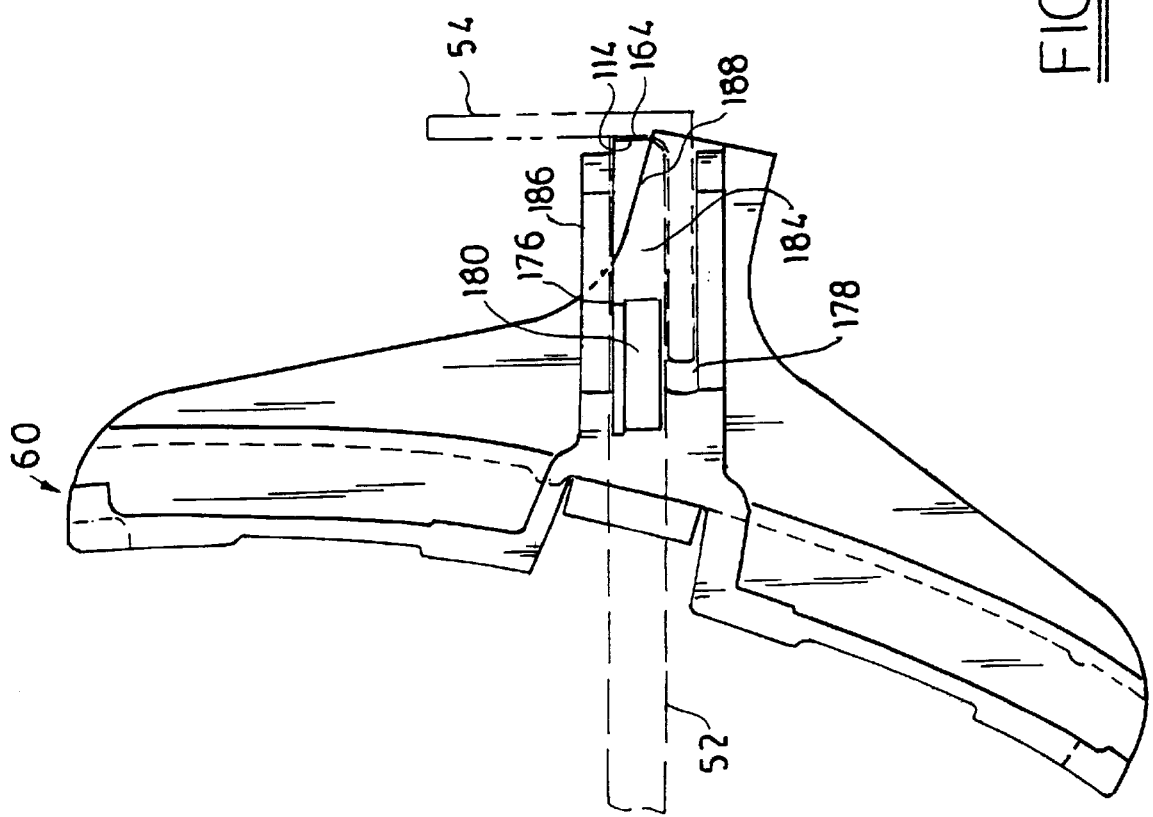

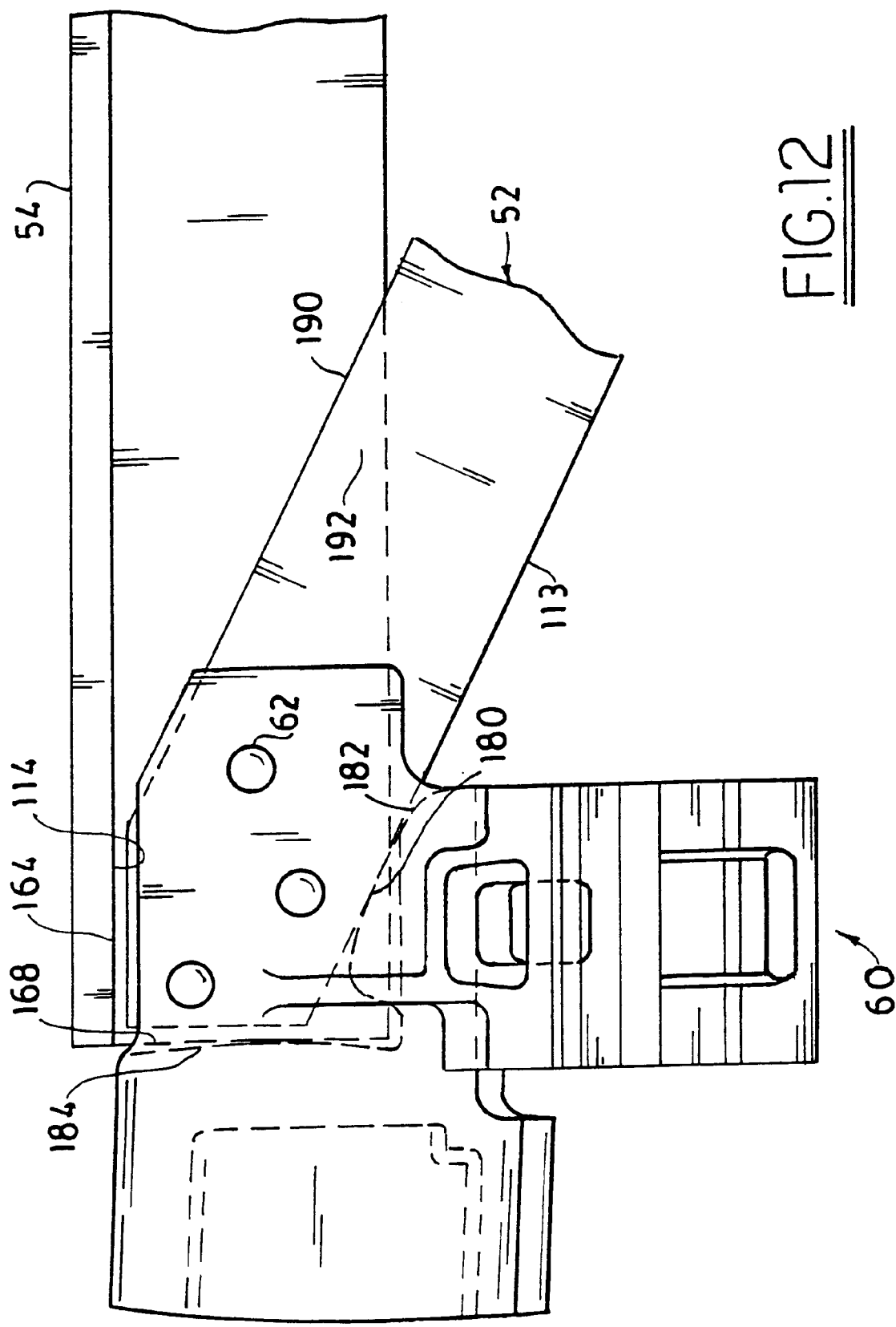

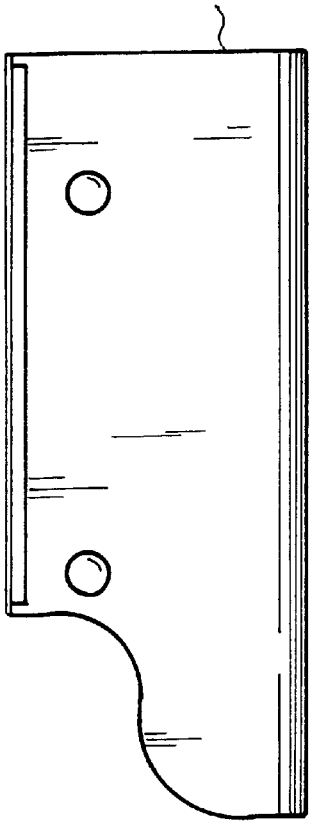
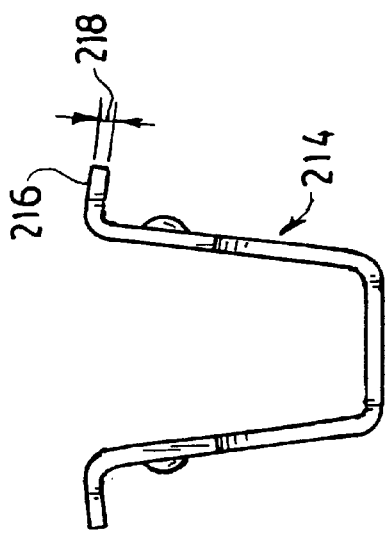
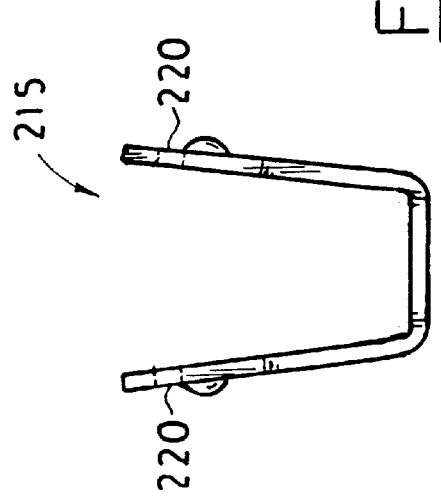

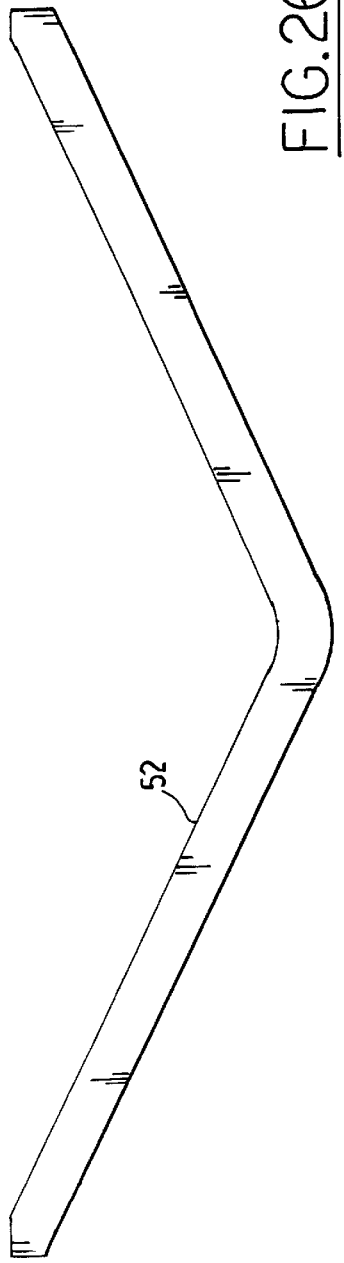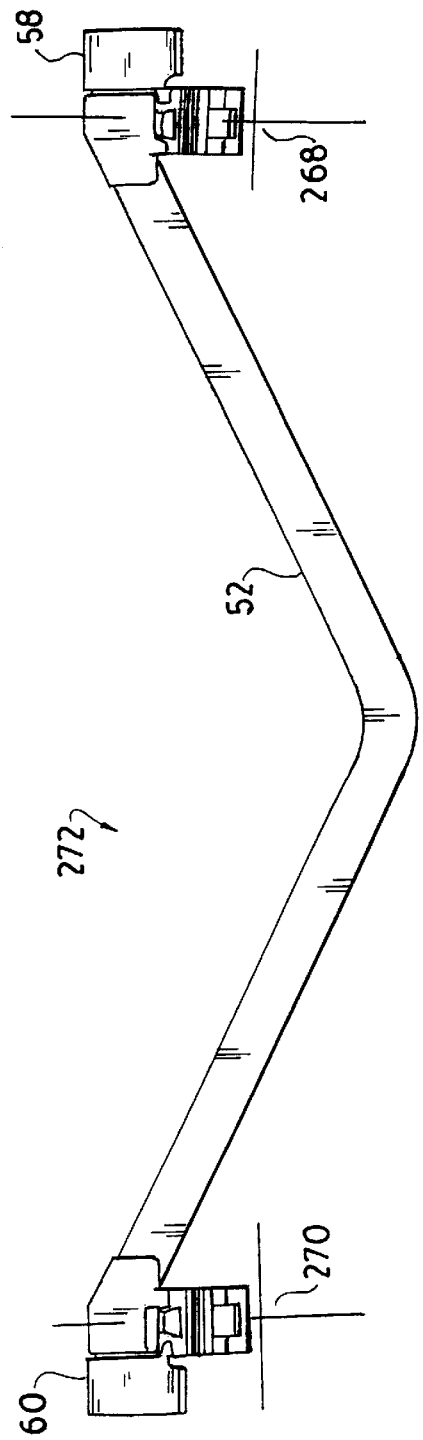

FIG. 28A
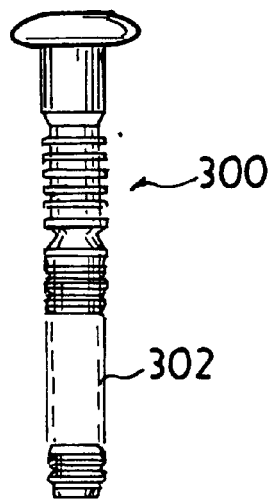
FIG. 28B
FIG. 28C
FIG. 29A
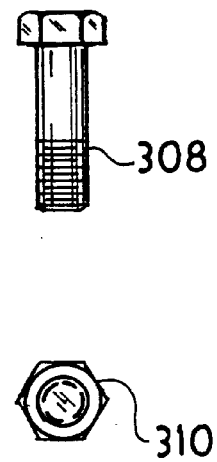
FIG. 29B
FIG. 30
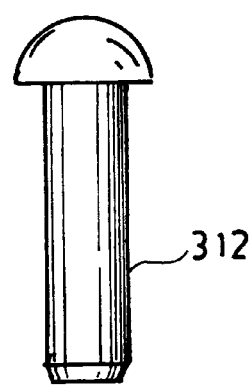

BRAKE BEAM

CROSS-REFERENCE TO RELATED PATENT APPLICATIONS

This application is a continuation-in-part of applicant's U.S. patent application Ser. No. 09/157,821, filed on Sep. 21, 1998, which in turn was a continuation-in-part of applicant's U.S. patent application Ser. No. 715,619, filed Sep. 13, 1996, now U.S. Pat. No. 5,810,124.

FIELD OF THE INVENTION

A brake beam for use on railroad car trucks.

BACKGROUND OF THE INVENTION

Brake beams are well known to those in the art and have been used with railroad car trucks for at least ninety years.

One such brake beam is disclosed in U.S. Pat. No. 2,517,747 of L. L. Whitney, which is assigned to American Steel Foundries of Chicago, Ill.; the entire description of this patent is hereby incorporated by reference into this specification.

This Whitney patent describes a hanger type brake beam comprising a compression member having top and bottom webs and a front web, a filler block externally of the space between said top and bottom webs, bearing against the forward surface of said front web and having an arcuate opening extending from the inboard to the outboard end of said block, a tension member of uniform cross-section from end to end thereof having an end portion bent approximately parallel to said front web, said portion being snugly fitted in said opening, a brake head having a cavity receiving said block, said portion and said webs, said break head having top and bottom rear walls connected to said top and bottom webs, said block and said portion, said connection extending lengthwise of said front web and being spaced from but extending adjacent to the inboard and outboard ends of the block.

The structure of the Whitney patent, in addition to being relatively heavy and cumbersome, provides relatively poor static strength and fatigue strength properties in use.

Another prior art brake beam of hangerless or unit type design is disclosed in U.S. Pat. No. 2,170,121 of C. R. Busch; the entire disclosure of this patent is also hereby incorporated by reference into this specification. This patent discloses a brake beam, including a channel section forming a compression member having its greatest depth at its middle portion, and which, toward its ends, gradually tapers down, and a tension member having its ends firmly attached to the ends of the compression member, the attached ends of the members all extending beyond the points of location for brake heads to guide the beam on car truck frames.

The brake bream device of this Busch patent also is relatively heavy and, per unit weight, provides relatively poor static strength and fatigue resistance properties.

By way of further illustration, other United States patents have disclosed various brake beam designs; none of them, however, have provided a unit brake beam with substantially improved static strength and fatigue strength properties per unit weight. Thus, illustrative of these prior art failed designs are the structures disclosed in U.S. Pat. Nos. 2,427,548 (integral brake beam with cruciform cross section), 2,499,905 (brake beam with integral truss and brake heads), 2,170,122 (brake beam with built-up compression and tension members), 2,193,580 (brake bream with broad surface for saddle of brake beam strut), and the like. The disclosures of these patents are also incorporated by reference into this specification.

It is an object of this invention to provide a brake beam structure which is relatively light weight but, also, has relatively high static strength and fatigue resistance properties.

It is another object of this invention to provide a brake bream structure which is substantially more durable and less likely to self-destruct during use than comparable multi-piece prior art brake beam devices.

It is another object of this invention to provide a brake beam structure which is greatly simplified and substantially easier to manufacture than prior art assemblies.

It is yet another object of this invention to provide a novel process for producing the brake bream structure of the invention.

SUMMARY OF THE INVENTION

In accordance with this invention, there is provided a multi-piece brake beam assembly comprised of a rectilinear compression member, a rectilinear tension member, strut means for connecting said tension member and said compression member, a brake head with a recess adapted so that said tension member and said compression member may be partially located therein, and first and second fastening means for fastening said tension member, said compression member, and said brake head.

Although the preferred embodiment of this invention is illustrated with regard to a hangerless or unit brake beam, the invention is equally applicable to a hanger type brake beam.

BRIEF DESCRIPTION OF THE DRAWINGS

The present invention will be more fully understood by reference to the following detailed description thereof, when read in conjunction with the attached drawings, wherein like reference numerals refer to like elements, and wherein:

FIGS. 5, 6, and 7 are plan, side, and front views, respectively of tension member 52.

FIGS. 8, 9, and 10 are plan, front, and side views, respectively, of compression member 54.

FIGS. 11 and 12 are side and top views, respectively, of brake head 58.

FIGS. 17A and 17B are side and end views, respectively, of a side frame wear plate.

FIG. 18 is an end view of another wear plate.

FIGS. 26A, 26B, 26C and 26D, are plan views illustrating the brake beam assembly at various points in its assembly process.

FIGS. 28A, 28B, and 28C are exploded views of preferred brake beam assembly fasteners.

FIGS. 29A, 29B, and 30 are views of other brake beam assembly fasteners.

DESCRIPTION OF THE PREFERRED EMBODIMENTS

Figure 1:
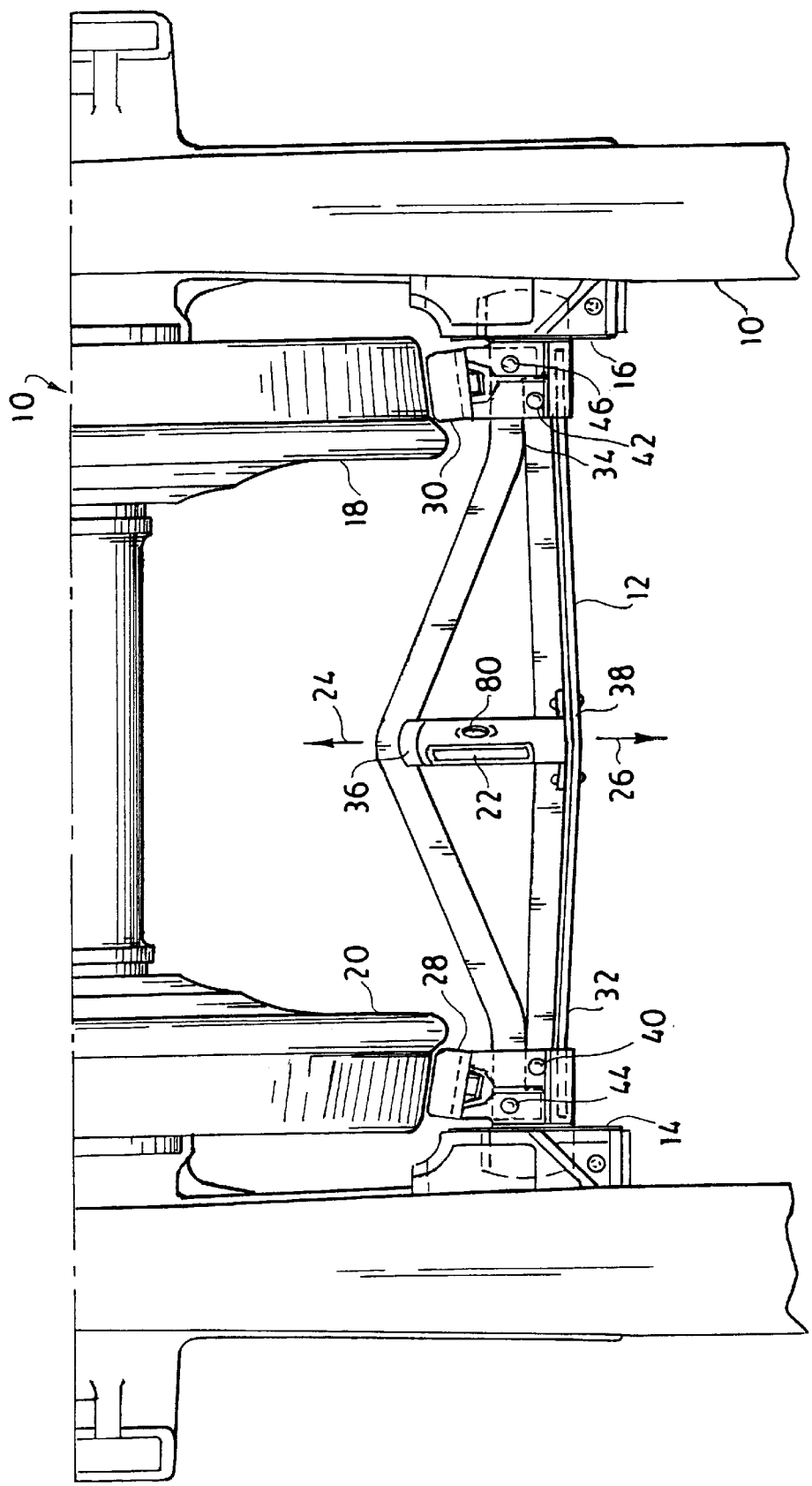
FIG. 1 is a broken plan view of a car truck 10 within which is disposed a brake beam assembly.

FIG. 1 is a broken plan view of a car truck 10. Provided within car truck 10 is brake beam assembly 12, supported on guides 14 and 16 located adjacent to the wheels 18 and 20. A lever (not shown) inserted within slot 22 applies force in the direction of arrows 24 and 26. When force is applied in the direction of arrow 24, the beam 12 moves in the direction arrow 24 so that brake shoes 28 and 30 contact wheels 18 and 20, respectively.

As is known to those skilled in the art, because of the substantial speeds at which railroad cars travel and the heavy loads they carry, large braking forces are required to be transferred to the wheels through the brake beam assemblies during their operation. These forces, and random vibrations borne through the truck structure to the brake beams, create stresses in areas such as areas 32, 34, 36, 38, 40, 42, 44, and 46.

The railroad industry has expressed concern about the safety record of the United States railroad system. Applicants' brake beam device has been developed in response to such concern.

Figure 2:
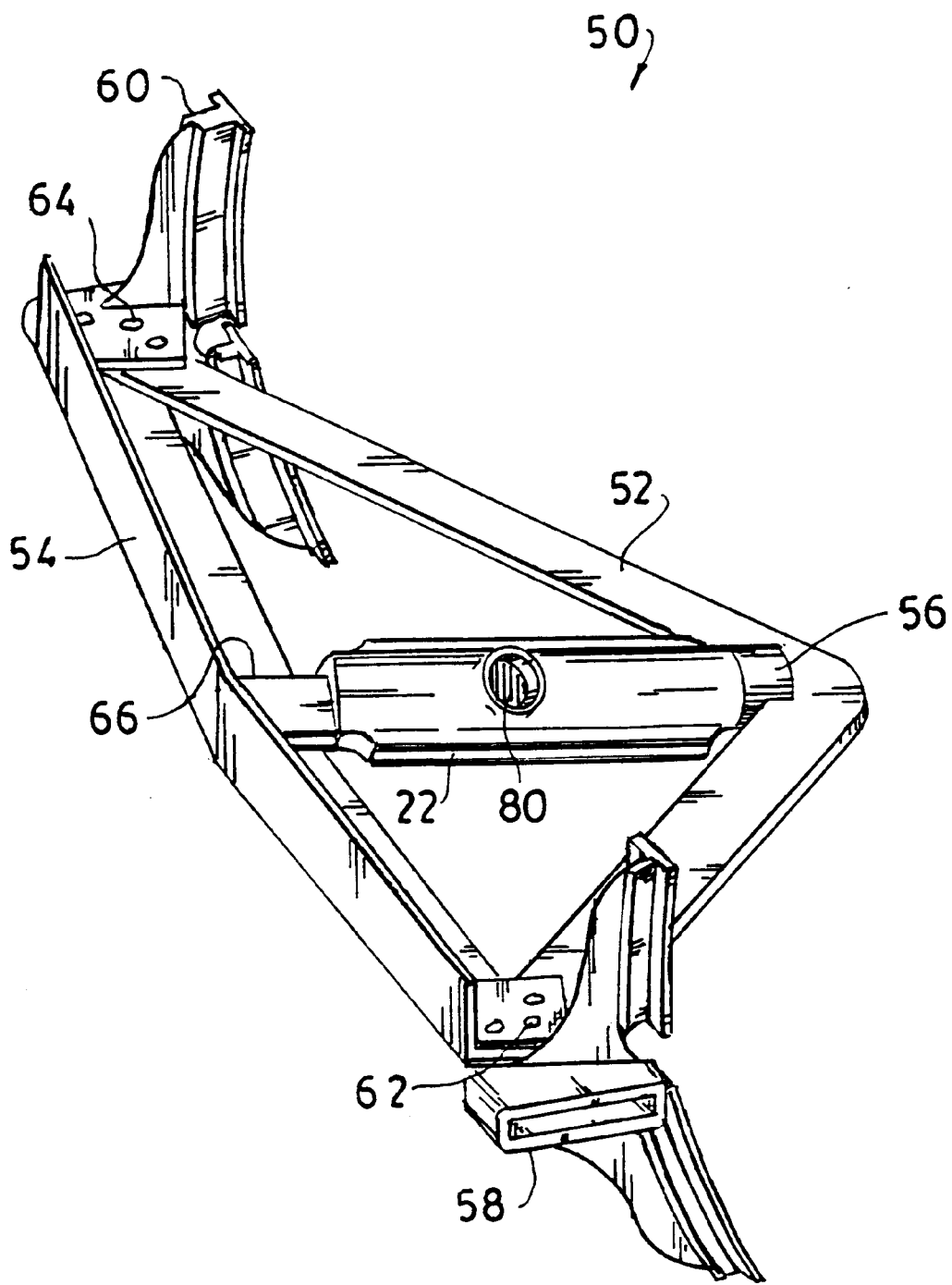
FIG. 2 is a first perspective view of one preferred embodiment of the brake beam of this invention.

FIG. 2 is a perspective view, taken above and from the back, of the brake beam unit 50 of this invention. Referring to FIG. 2, it will be seen that brake beam unit 50 is comprised of the following members: a rectiliner tension member 52, a rectilinear compression member 54, strut 56 joining members 52 and 54, brake heads 58 and 60 with recesses (not shown) within which members 52 and 54 partially nest, fasteners 62 and 64 which connect brake heads 58 and 60 to members 52 and 54, and a fastener 66 (not clearly shown in FIG. 2) connecting strut 56 to compression member 54. In this brake beam unit 50, the tension member 52, the compression member 54, and the fasteners 62 and 64 are structural members: if one or more of them are removed from the unit, it will not transmit brake force from the strut 56 to the brake heads 58 and 60. Thus, when reference is made in applicant's claims to ". . . no other structural member is disposed within said recess . . . ," it is intended to refer only to those members which are essential in transmitting brake force from the strut 56 to the brake heads 58 and 60. Other members which are not essential in performing this structural function, and whose absence will not adversely affect the performance of such function, may be ". . . disposed within said recess . . ." and still be within the scope of applicant's claims.

Figure 3:
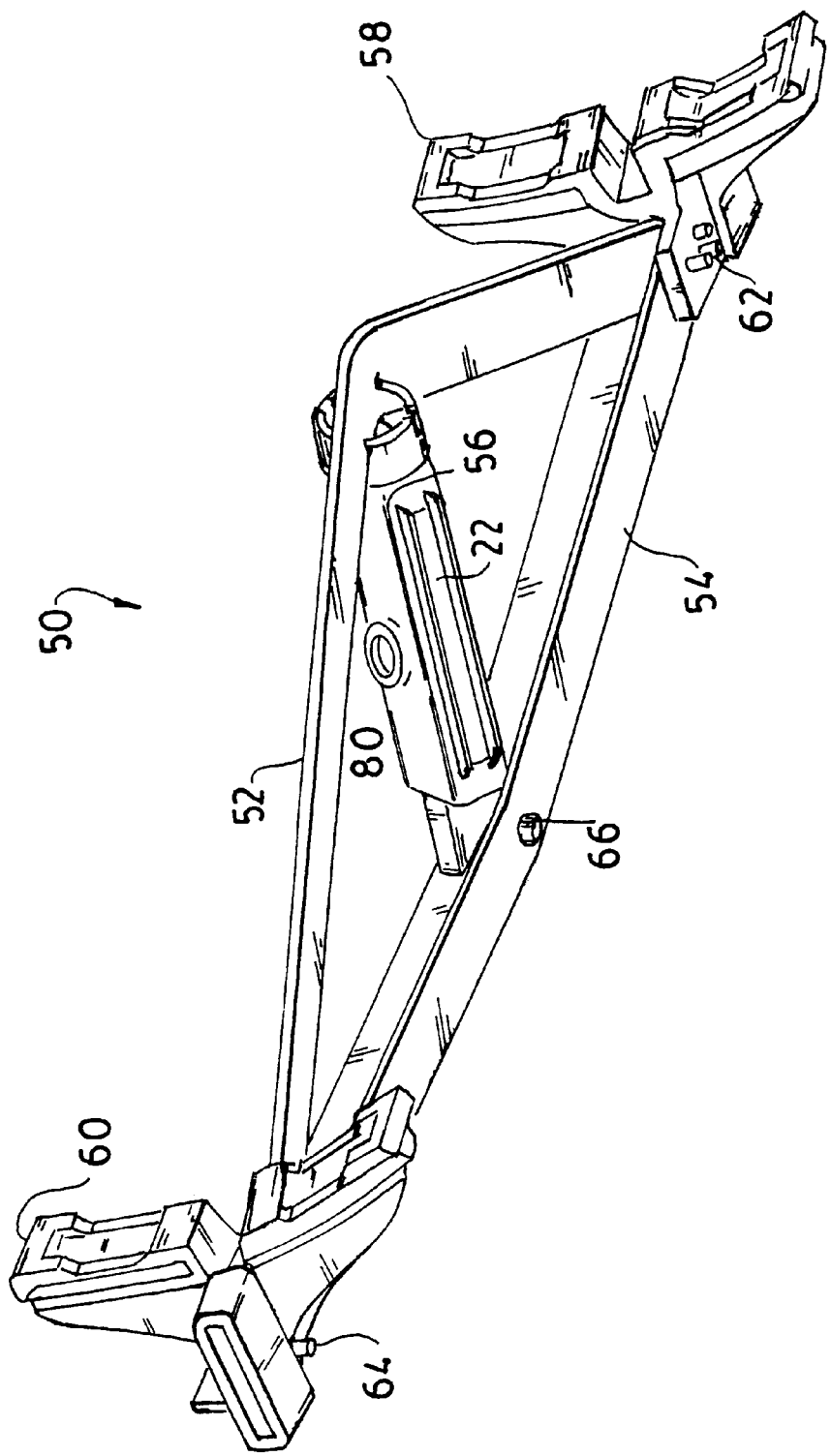
FIG. 3 is a second perspective view of the preferred embodiment of FIG. 2.

FIG. 3 is another perspective view of brake beam unit 50, taken from below unit 50 and to its front. Fastener 66 is more clearly indicated in FIG. 3.

Figure 4:
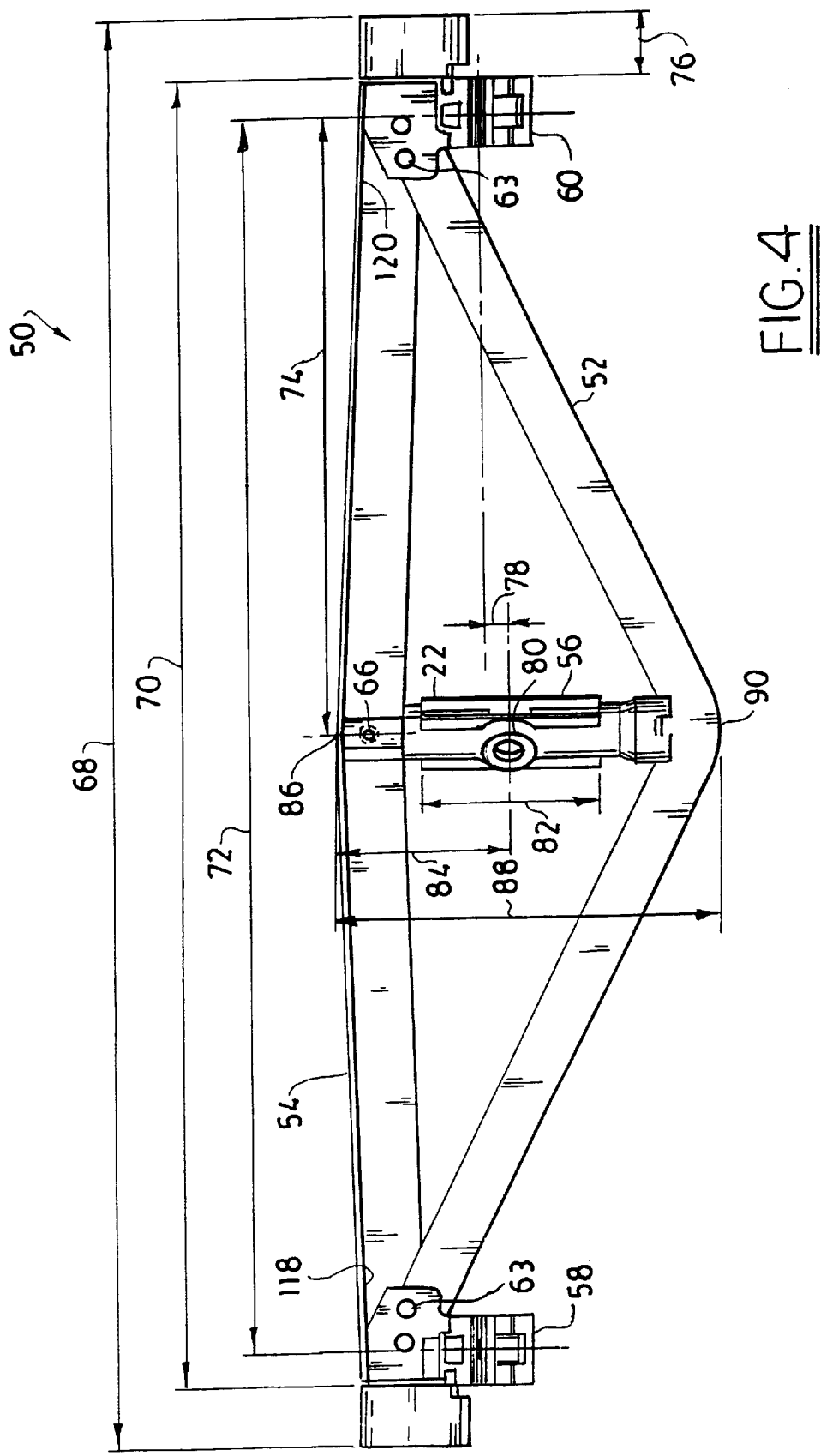
FIG. 4 is a plan view of the brake beam unit of FIG. 2.

FIG. 4 is a plan view of the brake beam unit 50. In this embodiment, the unit has only two fasteners 63 per end, the unit 50 has an overall length 68 of from about 69 to 70 inches, an overall distance 70 to the outside of the brake heads 58 and 60 of from about 63 to 64 inches, a distance 72 between the centerlines of the brake heads 58 and 60 of from about 60 to 61 inches, a distance 74 from the centerline of the beam unit 50 to the centerline of either brake head 58 or 60 of from about 29.5 to about 30.5 inches, a clear distance 76 from the end of beam 50 to either brake head 58 or 60 of from about 2.5 to about 3.5 inches, a distance 78 from the centerline face of brake head 58 (or 60) to the centerline of the strut pinhole 80 of from about 1 to about 1.5 inches, a length 82 of the strut lever slot 22 of from about 7.5 to about 8.5 inches, a distance 84 from point 86 (at the back of compression member 54) to the centerline of pinhole 80 of from about 7.5 to about 8.5 inches, and a depth 88 from point 86 to the nose 90 of tension member 52 of from about 17 to about 18 inches.

In one embodiment, the dimensions of brake beam unit 50 are in substantial accordance with the Association of American Railroads' "Manual of Standards and Recommended Practices", Section D, Trucks and Truck Details, Standard S-345-79 (Adopted 1875, Revised 1979), "Application Tolerances for Brake Beams, Hangerless Types" (See FIG. 12, page D-213).

Tension member 52

FIG. 5 is a plan view of tension member 52. Because of its unique geometry and construction, it is especially suited for use in applicants' brake beam 50. Tension member 52 is clearly a structural member of applicant's claimed brake beam: it transmits force from strut 56 to brake heads 58 and 60.

FIG. 6 is a side view of tension member 52. It will be seen that, in the preferred embodiments depicted in FIGS. 5 and 6, tension member 52 has a substantially "flat" cross-sectional shape. Thus, referring to FIG. 6, it will be seen that upper surface 92 and lower surface 94 are substantially parallel to each other, thereby producing the desired flat structure 52 which consequently can be within the recess (not shown) in brake head 58 and/or 60. Alternatively, one may use members with other cross-sectional shapes. As will be apparent to those skilled in the art, as long as there is at least one leg with two substantially parallel sides, other structural members may be present in tension member 52.

In one embodiment, not shown, tension member 52 forms an angle of about 90 degrees throughout its length.

Referring again to FIG. 6, it is preferred that tension member 52 have a cross-sectional area of from about 0.5 to about 5.0 square inches and, more preferably, from about 1.0 to about 3.0 square inches. In an even more preferred embodiment, the cross-sectional area of tension member 52 is from about 1.2 to about 2.0 square inches.

The cross-sectional area of tension member 52 is the product of its width 96 and its thickness 98 (see FIG. 7).

Referring to FIG. 5, width 96 is preferably substantially constant over its entire length; and width 96 preferably is from about 1 to about 4 inches. In a more preferred embodiment, width 96 is from about 2 to about 3 inches.

In addition to having a constant width 96, tension member 52 preferably is comprised of parallel walls 107 and 109, and 111 and 113 which, when they extend past arcuate section 112 on either side, are substantially straight, without any bends.

Referring again to FIG. 7, walls 107 and 111 are cut to form notched sections 114 and 116. Notched sections 114 and 116 preferably will be substantially contiguous with surfaces 118 and 120 of compression member 54 (see FIG. 4).

Referring to FIG. 7, thickness 98 is preferably from about 0.25 to about 4 inches. In a more preferred embodiment, thickness 98 is from about 0.35 to about 1.0 inches.

It is preferred that tension member 52 be comprised of or consist essentially of a material such that, with the preferred cross-sectional area, member 52 have a yield strength of from about 20,000 to 100,000 pounds per square inch and, more preferably, from about 30,000 to about 60,000 pounds per square inch. In one embodiment, tension member 52 consists essentially of carbon steel with a carbon content of from about 0.05 to about 0.8 percent.

It is also preferred that tension member 52, with the specified cross-sectional area, have an elongation at break of at least about eight percent and, more preferably, at least about 12 percent.

Referring again to FIG. 5, and in the preferred embodiment depicted therein, it will be seen that tension member 52 preferably has an overall length 100 of from about 50 to about 70 inches and, more preferably, from about 60 to about 65 inches. Inasmuch as tension member 52 is preferably symmetrical around its midpoint 102, distance 102 is preferably at one-half of distance 100.

Referring again to FIG. 5, it will be seen that tension member 52 preferably has a depth 104 (as measured from the deepest portion of internal bend radius 106) of from about 5 to about 17 inches and, more preferably, from about 10 to about 15 inches.

Referring again to FIG. 5, it will be seen that tension member 52 is comprised of legs 108 and 110 which are integrally connected to each other through arcuate section 112. The angle 114 formed between legs 108 and 110 is preferably greater than about 105 degrees and, more preferably, is from about 110 to about 150 degrees. In one embodiment, angle 114 is from about 120 to about 140 degrees.

As is more clearly indicated elsewhere in this specification, tension member 52 is contiguous with the first brake head 58 and the second brake head 60.

Compression member 54

FIG. 8 is a plan view of compression member 54. Because of its unique geometry and construction, it is especially suited for use in applicants' brake beam 50. In applicant's claimed brake beam, the compression member 54 is also a structural member which transmits force from strut 56 to brake heads 58 and 60.

Referring to FIGS. 8, 9, and 10 it will be seen that compression member 54 is preferably comprised of legs 126 and 128 (see FIG. 10) which extend through substantially its entire length 130 (see FIG. 8).

Referring to FIG. 10, and in the preferred embodiment depicted therein, legs 126 and 128 for a substantially ninety degree angle between them. As will be apparent to those skilled in the art, this configuration affords substantial column strength to member 54. Means for measuring and calculating the column strength of structural members are well known to those skilled in the art. Reference may be had, e.g., to U.S. Pat. Nos. 5,419,373, 5,409,470, 5,403,292, 5,322,213, 5,279,442, 5,217,128, and the like. The disclosure of each of these United States patents is hereby incorporated by reference into this specification.

As will be apparent to those skilled in the art, different cross-sectional shapes will afford different amounts of column strength per unit weight. A square tubular shape, or a rectangular tubular shape, gives good results. A cruciform shape also gives relatively good results.

In one preferred embodiment, illustrated in FIG. 10, the compression member is in the form of a right angle. In the preferred embodiment depicted in FIG. 10, leg 126 has thickness 125 of from about 0.1 to about 0.5 inches and, more preferably, from about 0.2 to about 0.4 inches. Leg 126 preferably has a length 127 of from about 0 to 5 inches and, preferably, from about 2 to about 4 inches.

Similarly, leg 128 has a thickness 131 of from about 0.1 to about 1.0 inches and, more preferably, from about 0.2 to about 0.4 inches. Leg 128 has a length 133 of from about 1 to about 5 inches and, more preferably, from about 2 to about 4 inches.

It is preferred that compression member 54 be comprised of or consist essentially of a material such that it have a yield strength of from about 20,000 to 100,000 pounds per square inch and, more preferably, from about 30,000 to about 60,000 pounds per square inch. In one embodiment, compression member 54 consists essentially of carbon steel with a carbon content of from about 0.05 to about 0.8 percent.

It is also preferred that compression member 54 have an elongation at break of at least about eight percent and, more preferably, at least about 12 percent.

Referring to FIG. 8, and in the preferred embodiment depicted therein, it will be seen that compression member 54 preferably has an overall length 130 of from about 50 to about 70 inches and, more preferably, from about 60 to about 65 inches. Inasmuch as compression member 54 is preferably symmetrical around its midpoint 135, distance 133 is preferably at one-half of distance 130.

Referring again to FIG. 8, it will be seen that compression member 54 is comprised of end sections 132 and 134 which are partially disposed within a recess (not shown) in each of brake heads 58 and 60(see FIG. 2). The end sections 132 and 134 preferably contain flat, substantially parallel surfaces 136,138 and 140,142 which are adapted to fit within such recess (not shown). Each of end sections 132 and 134 will have a length 144 (which may be identical or different) of from about 2 to about 12 inches and, more preferably, from about 6 to about 10 inches.

Referring to FIG. 9, and in the preferred embodiment depicted therein, it will be seen that end compression member 54 is comprised of a first section 146 and a second section 128. The base leg 152 of section 146 is not coplanar with the base 154 leg of section 148; an offset 150 of from about 0 to about 2.0 inches is preferably used. In one preferred embodiment, offset 150 is from about 0.5 to about 1.5 inches. As is known to those skilled in the art, the term "sweep" is often used to describe such an offset.

FIG. 8 is a view of compression member 54 taken from its top. As is shown by this plan view, compression member 54 is preferably offset in two different directions which are orthogonal to each other.

Referring to FIG. 8, it will be seen that compression member 54 is comprised of upright leg 156 and upright leg 158, which are not coplanar with each other. Leg 158 has an offset (camber) 160 from leg 156 of from about 0 to about 2.0 inches. In one preferred embodiment, the offset/camber 160 is from about 0.5 to about 1.5 inches.

Referring again to FIG. 8, and in the preferred embodiment depicted therein, it will be seen that each of sections 146 and 148 are comprised of flat surfaces 164 and 162 which are adapted to be substantially contiguous with notched sections 114 and 116 (see FIG. 5). Furthermore, each of sections 146 and 148 are comprised of end walls 168 and 166 which are adapted to be substantially contiguous with corresponding surfaces (not shown) of brake heads 58 and 60.

In another embodiment, not shown, such compression member 54 is not contiguous with either said notched sections 114 and/or 116, and/or with said brake heads 58 and/or 60.

It will be seen that, in the preferred embodiment illustrated in FIG. 8, inside surface 162 is substantially coplanar with inside surface 161 of leg 158. Similarly, inside surface 164 is substantially coplanar with inside surface 163 of leg 156. As will be apparent to those skilled in the art, because of the pitch on compression member 54, the 1:20 face angle required for brake heads 58 and 60 may be obtained without additional structural modifications.

Referring again to FIG. 8, at about its midpoint 135, base legs 152 and 154 are joined (see FIG. 9), and at this juncture this is a substantially coplanar section 170 extends from about point 172 to about 174 and is preferably from about 2 to 4 inches in length.

Brake Head 58

FIGS. 11 and 12 are side and top views, respectively, of brake head 58 which, as will be apparent to those skilled in the art, is preferably substantially identical to brake head 60.

The brake head 58 illustrated in FIGS. 11 and 12 are configured in substantial accordance with the aforementioned Association of American Railroad's "TRUCKS AND TRUCK DETAILS" publication. In particular, these embodiments are in substantial accordance with pages Standard S-371-81, "LIMITING CONTOUR OF BRAKE HEADS FOR HANGERLESS TYPE BRAKE BEAMS", which appears on page D-250 of such publication. As will be apparent from an examination of such Standard S-371-81, some of the components depicted in FIGS. 1, 2, 3, 4, 12, 13, 19, 26, and 27 are not called for by such standard, are not essential, and may be omitted or modified. Thus, by way of illustration and not limitaton, one may omit or modify such nonessential features as, e.g., the brake head end extensions (see, e.g., FIG. 26D, the brake head key guide 194 (see FIG. 15), the brake head key latch 196 (see FIG. 16), and the like.

Referring to FIGS. 11 and 12, it will be seen that brake head 58 (and brake head 60) is comprised of a recess defined by flat, parallel, inner surfaces 176 and 178. As will be apparent to those skilled in the art, brake heads with recesses of other shapes also may be used. The term recess, as used in the specification and the appended claims, refers to any indentation, depression, notch, or other opening(s) adapted to receive one or more structural members therein. In the embodiment depicted in FIG. 11, the recess has a substantially rectangular cross section defined by three surfaces. In other embodiments, not depicted, the recess could have a substantially semicircular cross section, a regular cross section and/or an irregular cross-section defined by at least two, three, four, or more surfaces, etc. The precise configuration of the recess can vary widely.

Referring to FIG. 12, it will be seen that tension member 52 is comprised of linear surface 113 which, in part, abuts a portion of arcuate surface 180. Because of the curved nature of surface 180, varying the length of distance 72 of assembly 50 while keeping distance 88 constant (see FIG. 4) will allow surface 180 to compensate for such variation and to maintain substantially broad contact between it linear surface 113.

Referring again to FIGS. 11 and 12, it will be seen that surface 180 is also comprised of arc 182 which, when the assembly 50 under loaded conditions deflects, compensates for such deflection.

Referring to FIGS. 11 and 12 (and also to FIG. 13), and in the preferred embodiment depicted therein, it will be seen that brake head 58 is comprised of inner surface 184 which is adapted to receive surface 168 of compression member 54.

Figure 14:
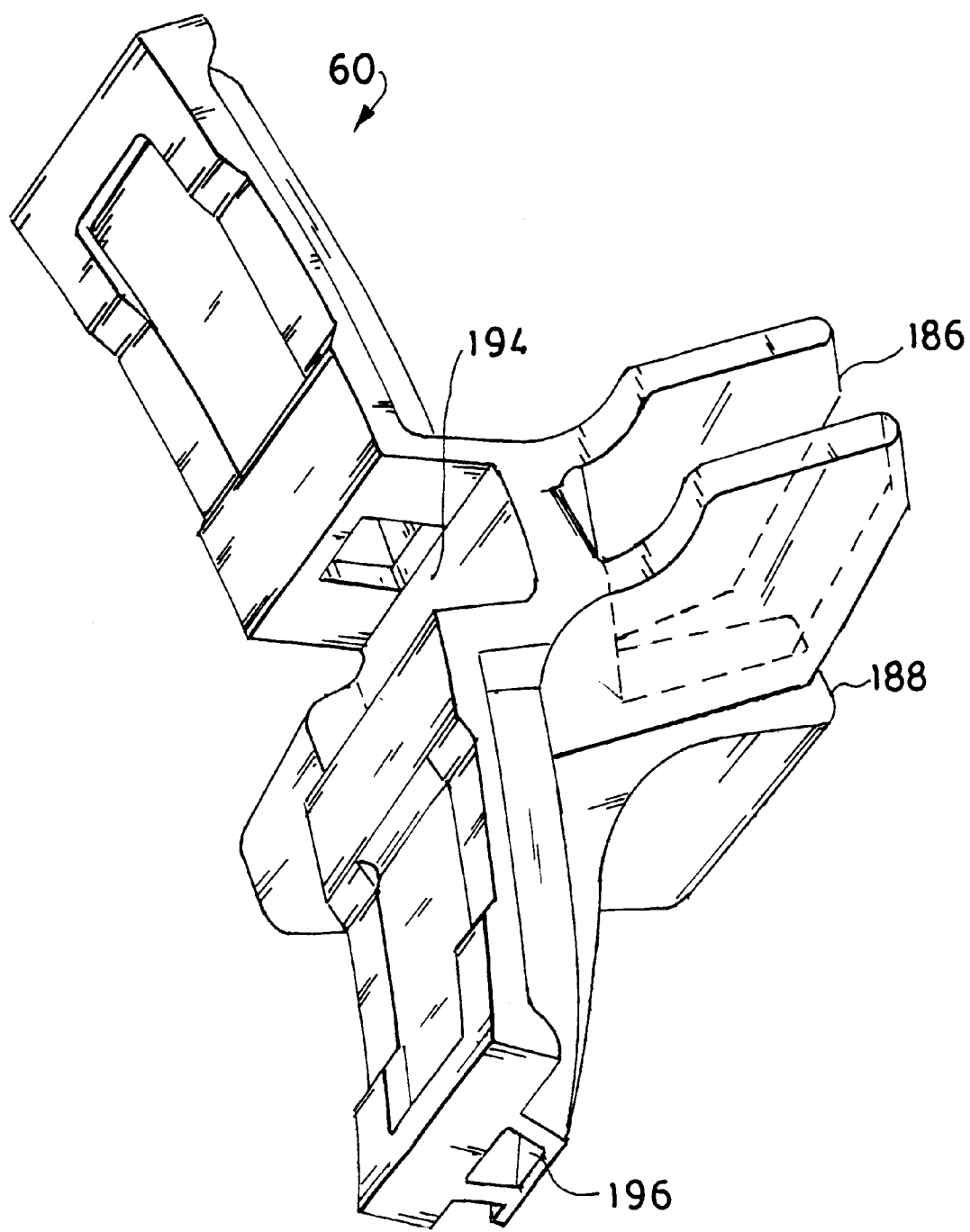

Referring again to FIG. 11, it will be seen that brake head 60 is comprised of a split flange 186; this split flange is illustrated in by dotted lines in FIG. 14.

It will be seen from FIG. 12, e.g., that fasteners 62 which secure tension member 52 to brake head 60 are not colinear. Three fasteners 62 are used in this assembly, although four or more fasteners also may be used.

Without wishing to be bound to any particular theory, applicants believe that, under load, area 190 of compression member 54 makes contact with the underside of area 192 of tension member 52. Because of the nesting arrangement of members 52 and 54, this movement is limited.

Referring again to FIG. 12, and in the preferred embodiment depicted therein, it will be seen that three fasteners are disposed within the recess of the brake heads. In another embodiment, not shown in FIG. 12, only two such fasteners are disposed within the recess of the brake head. In yet another embodiment, not shown in FIG. 12, only one such fastener is disposed within the recess of the brake head.

Figure 13:
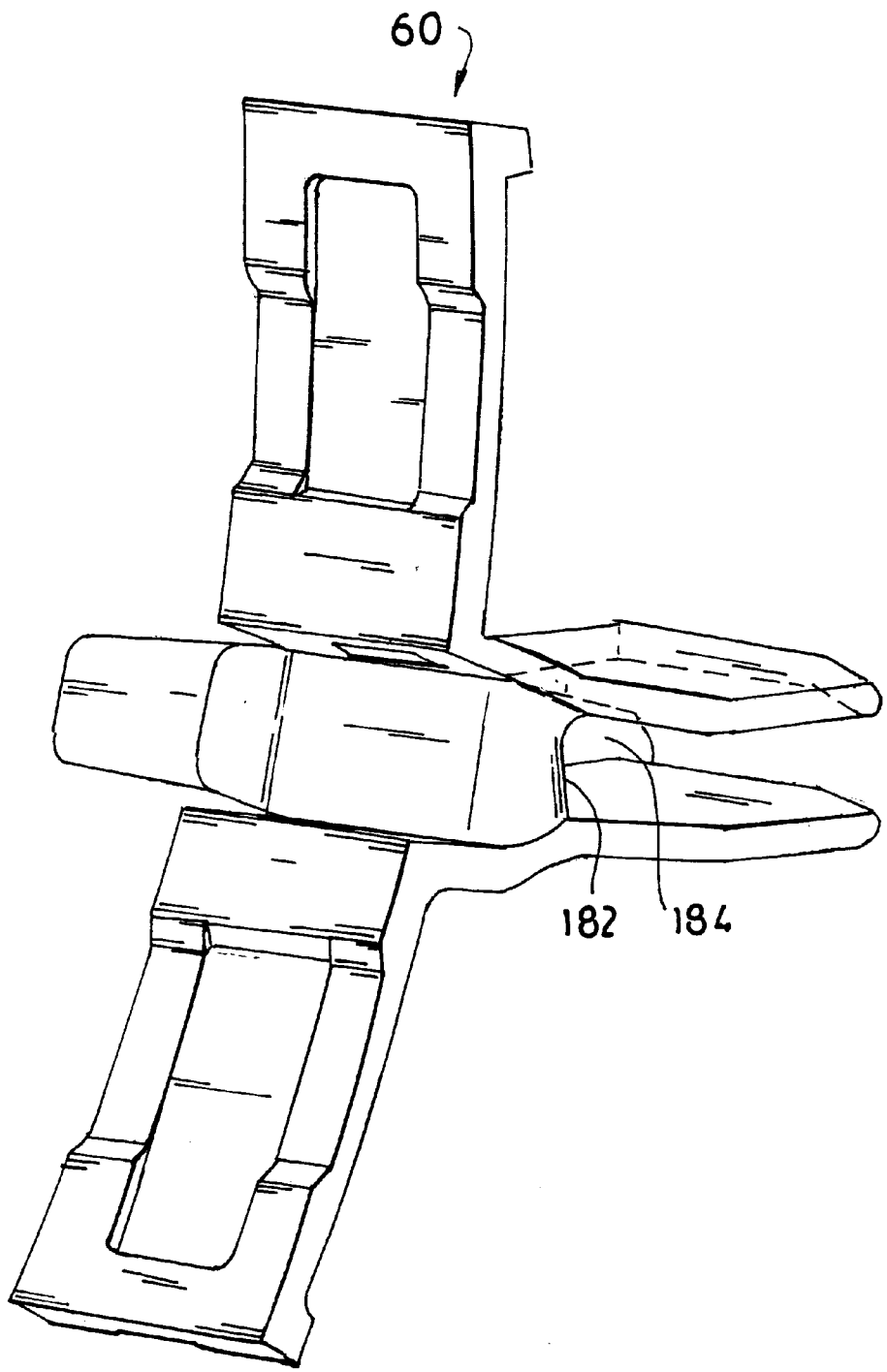
FIGS. 13, and 14 are perspective views of brake head 58.

FIG. 13 is a perspective view of brake head 60, illustrating arc surface 182 tapering away from the tension member (not shown), and also showing surface 184, which contacts the end of the compression member (not shown).

FIG. 14 is perspective view of brake head 60, showing, in dotted line outline, split flange 186 and an extension 188. It will be seen that a key guide 194 provides a raised passageway for a brake key (not shown in FIG. 14). Key latch 196 is adapted to retain the key (not shown) within the key guide.

Figure 15:
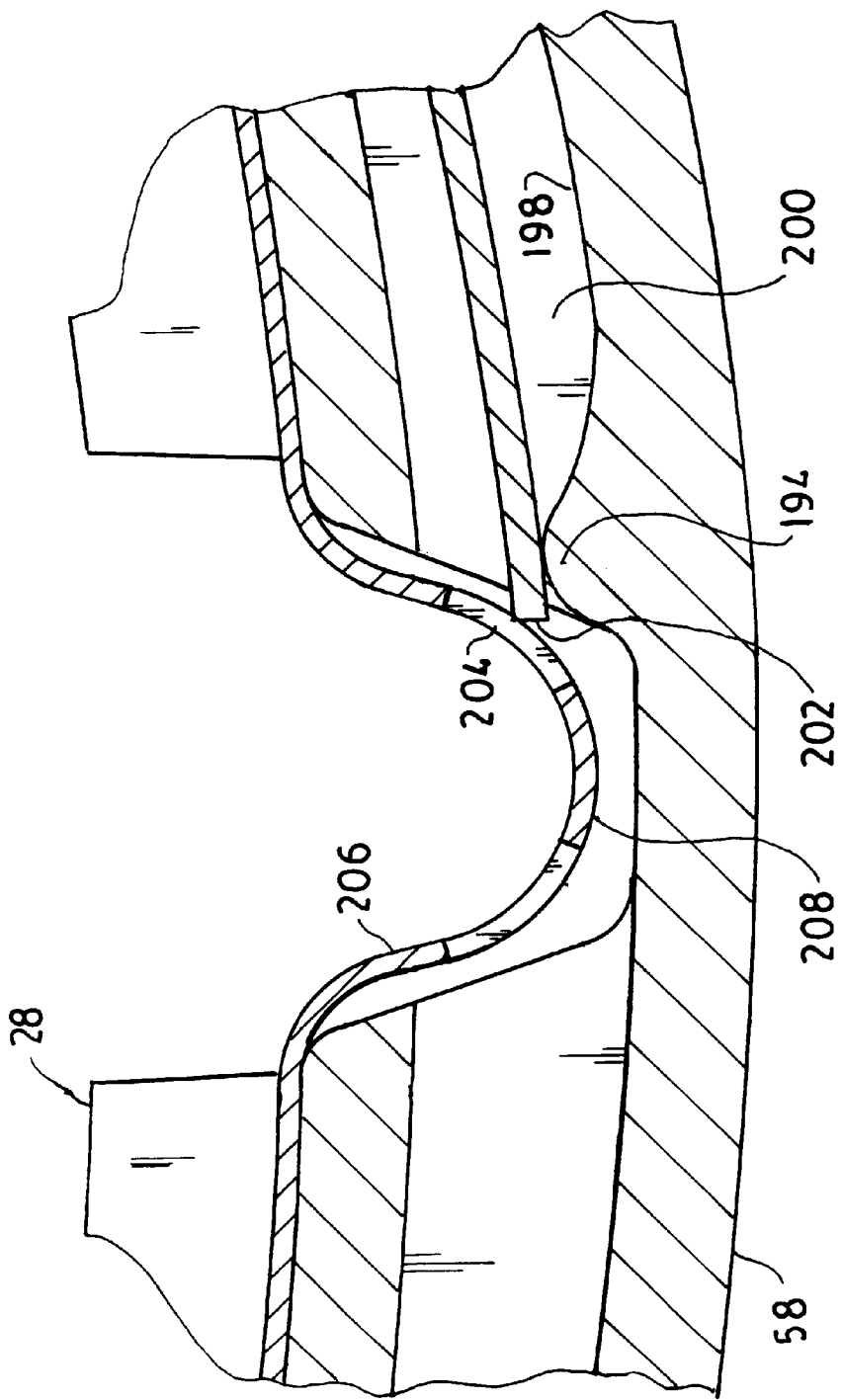
FIG. 15 is a sectional view of a brake head 58 and its associated brake shoe assembly.

FIG. 15 is an exploded sectional view illustrating the key assembly. Referring to FIG. 15, it will be seen that a key 198 is disposed within keyway tunnel 200. Within keyway tunnel 200 is a raised surface, key guide 194, which causes the end 202 of key 198 to be shifted upwardly so that it can enter the slot 204 in brake shoe lug 206. As will be apparent to those skilled in the art, if key guide 194 were not provided, key 198 would be allowed to pass behind the tip 208 of brake shoe lug 206 and, thus, would not engage brake shoe 28 via slot 204.

Figure 16A:
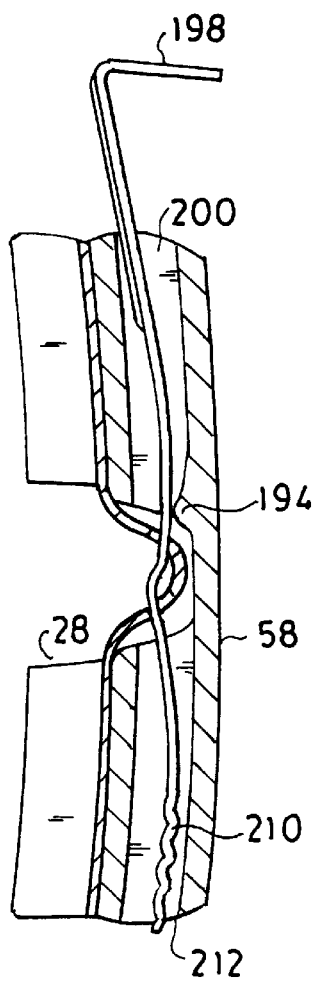
FIGS. 16A, 16B, and 16C are sectional views of a brake head shoe and key assembly.
Figure 16B:
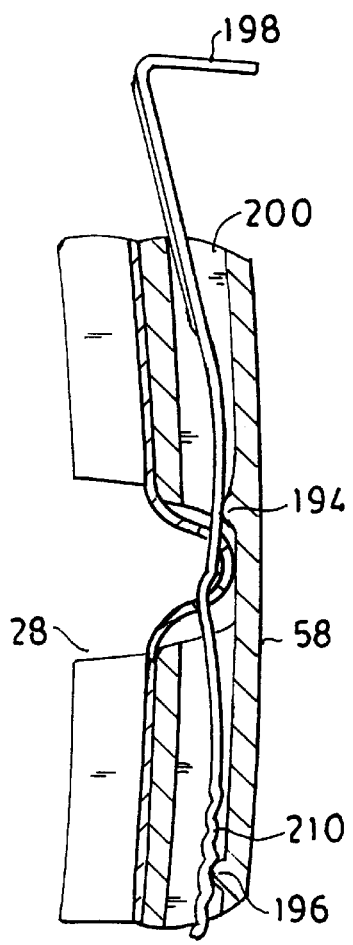
Figure 16C:
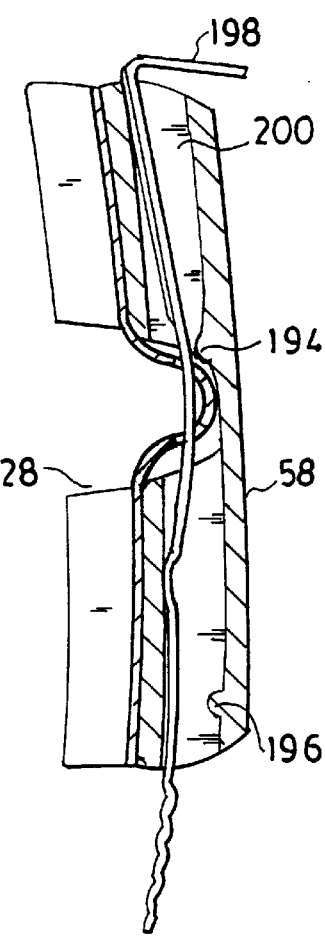

FIG. 16C illustrates a key 198 fully installed in a key assembly; FIGS. 16B and 16C illustrate the key 198 partially removed from the key assembly.

FIG. 16A illustrates one embodiment of a brake key assembly in which key 198 has a region 210 comprised of multiple pleats which are adapted to engage the bottom inside tip 212 of the keyway tunnel 200. These pleats are provided in substantial accordance with the Association of American Railroads "Brake Shoe Keys Standard" S-376 (see page D256).

FIGS. 16B and 16C illustrate a modified keyway tunnel 200 comprised of a raised section 196 (key latch 196) which is adapted to interlock with pleated section 210. As those skilled in the art will be aware, the provision of key latch 196 provides a safety factor for retaining the key 198 within the keyway; and it also deters the complete removal of such key 198.

As will be apparent from FIG. 16C, when key 198 is in its fully installed position, it is not contiguous with key latch 196, and its service life is thus not appreciably affected by such key latch 196. Only when key 198 is partially removed (see FIGS. 16A and 16B) does it contact the key latch 196, which inhibits its complete removal.

FIGS. 17A and 17B, and 17C are plan and end views, respectively, of truck side frame wear plate 214, which preferably consists essentially of either steel or plastic. In the preferred embodiment depicted, it is preferred that each of ears 216 have a thickness 218 which is less than about 0.19 inches and, more preferably, less than about 0.16 inches. In one embodiment, side frame wear plate 214 consists essentially of polyurethane.

FIG. 18 shows another embodiment of a truck side frame wear plate 215 in which lips 216 are omitted. In this embodiment, it will be seen that wear plate 215 is comprised of openings 220 (shown in dotted line outline) which are adapted to facilitate the removal of the wear plate 15.

Figure 19:
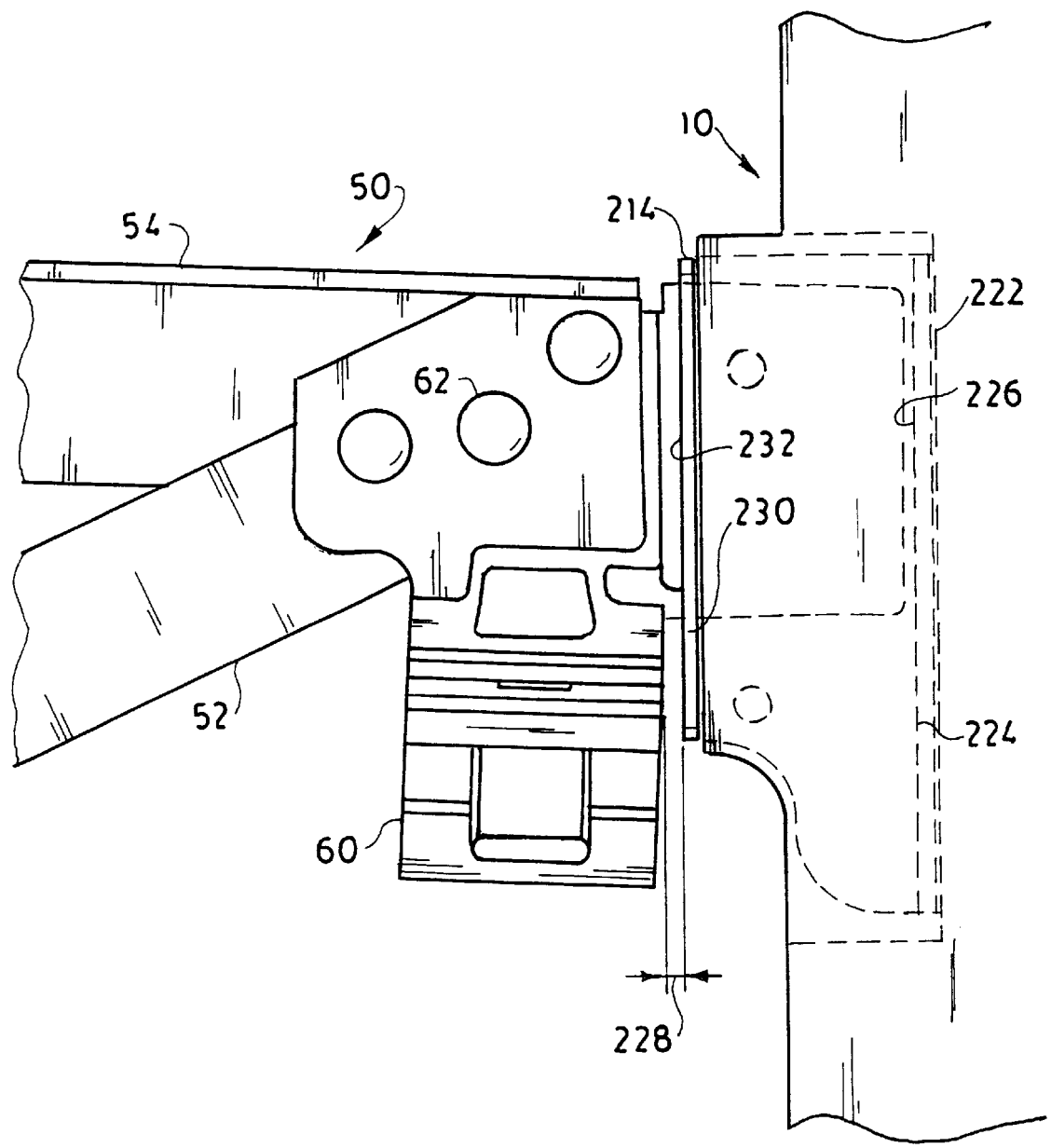
FIG. 19 is a plan view of a beam assembly disposed within a truck side frame.

FIG. 19 is plan view of the brake beam 50 connected to side frame 10. Referring to FIG. 19, it will be seen that there is a gap 224 between the tip 222 of the brake beam end extension and the inside bottom surface 226. There is also a gap 228 between the outside surface 230 of the brake head 60 and the outer surface 232 of the wear plate liner 214. It will be seen, because of the preferred configuration of applicants' assembly, gap 228 is greater than gap 224. It is preferred that gap 228 be greater than gap 224 by at least about 0.03 inches and, more preferably, by at least about 0.06 inches. As will be apparent to those skilled in the art, this end is achieved by either reducing the thickness 218 and/or removing lip 216; and this result reduces the possibility of brake beam binding.

Strut 56

Figure 20:
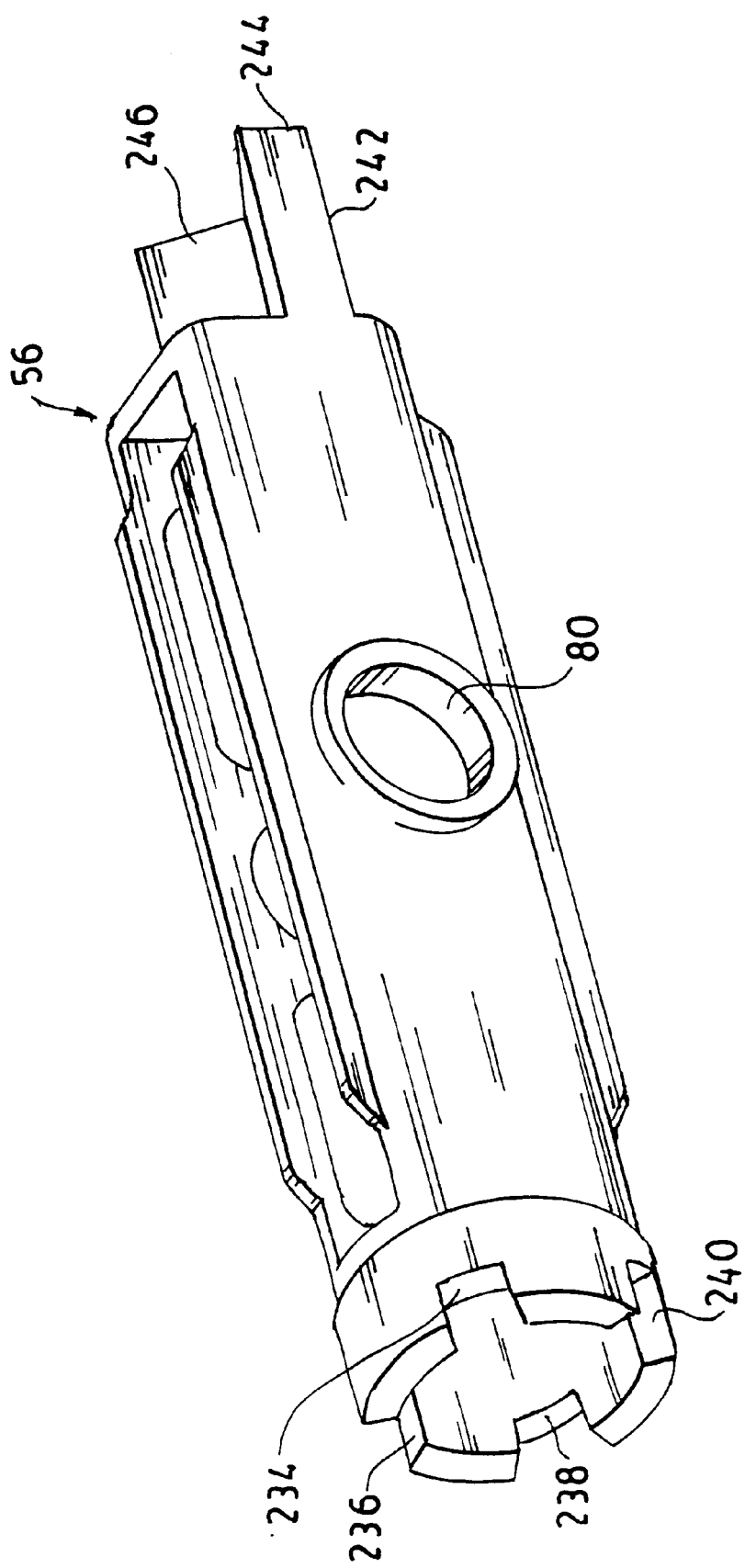
FIG. 20 is a perspective view of a brake beam strut.

FIG. 20 is a perspective view of strut 56 which is preferably comprised of slots 234, 236, 238, and 240, which are adapted to engage the tension member 52 (see FIG. 2). It will also be seen that strut 56 is comprised of tail support 242 comprising legs 244 and 246 which are adapted to engage compression member 54 (see FIG. 2). Strut pin hole 80 is adapted to receive a bushing (not shown).

Figure 21B:
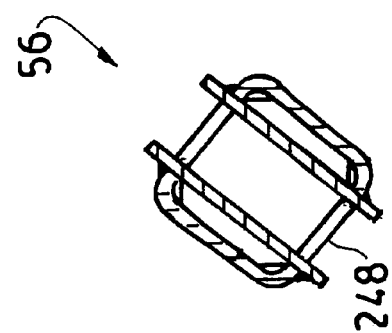
FIGS. 21A and 21B are a side view and a sectional view of the brake beam strut of FIG. 20.
Figure 21A:
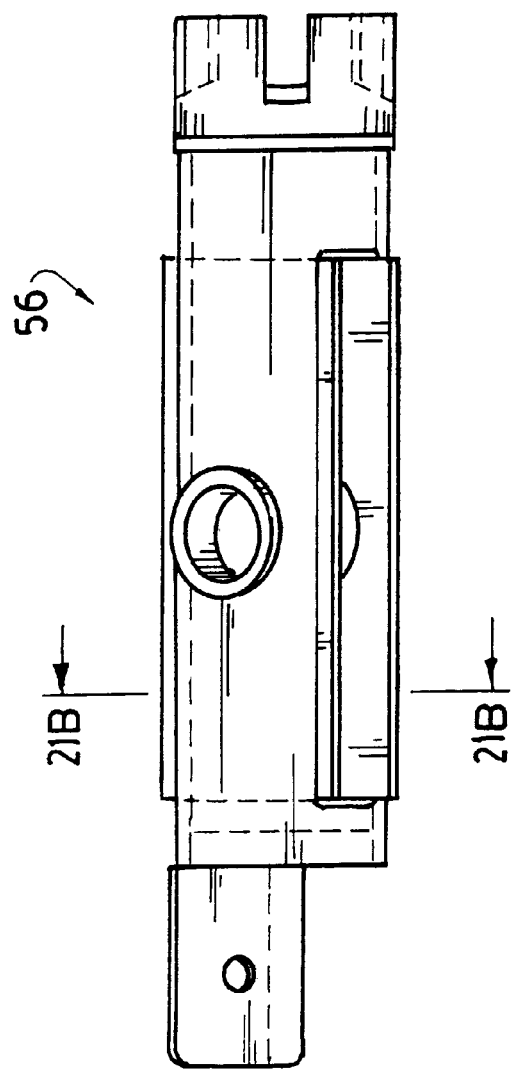

FIGS. 21A and 21B are side and sectional views, respectively of strut 56. It will be seen that, in the preferred embodiment depicted, the strut 56 is comprised of a tube-shaped steel assembly 248.

Figure 22:
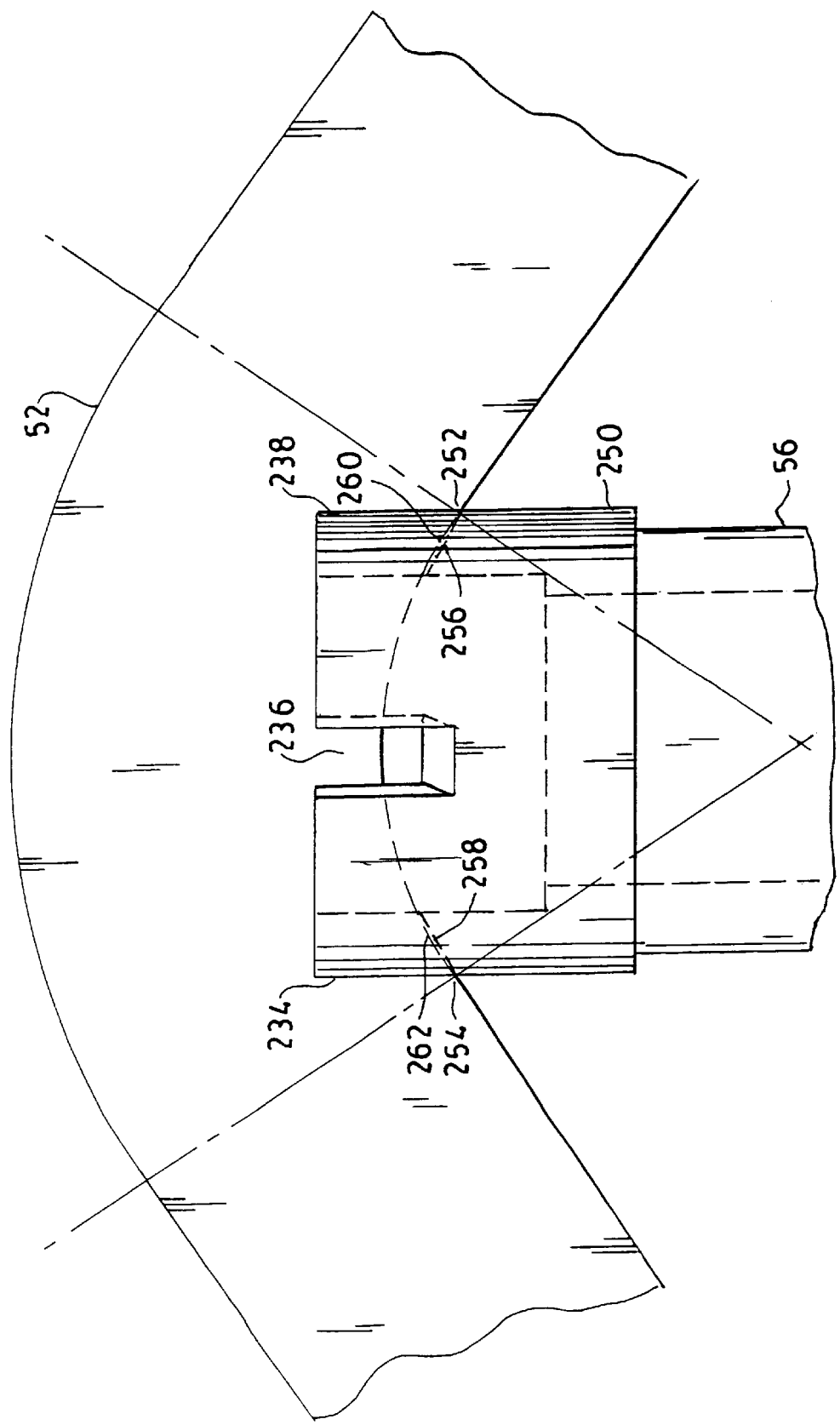
FIG. 22 is a plan view of the brake beam strut of FIG. 20 disposed within the tension member.

FIG. 22 is a plan view of strut 56 engaging tension member 52. In the embodiment depicted, the perimeter 250 of strut 56 intersects tension member 52 at tangent points 252 and 254, thus providing a substantial amount of stability and self-centering. It is preferred that the diameter of strut 56 be at least from about 2 to about 5 inches.

Referring again to FIG. 22, contact surfaces 256, 258, 260, and 262 help provide such stability. Contact surfaces 256 and 258 each have a pitch which is smaller than the pitch of contact surfaces 260 and 262, thereby insuring contact at points 252 and 254. As the assembly is loaded, contact will be made at the desired contact surfaces 256, 258, 260, and 262.

As will be apparent to those skilled in the art, because contact occurs at at least two locations (256 and 258) rather than at only a single location reduces the potential fatigue failure at any one point.

Referring again to FIG. 22, it will be seen that slots 234 and 238 provide substantial interlock between strut 56 and tension member 52. Reference also may be had to FIG. 2, which shows such interlock.

Figure 23A:
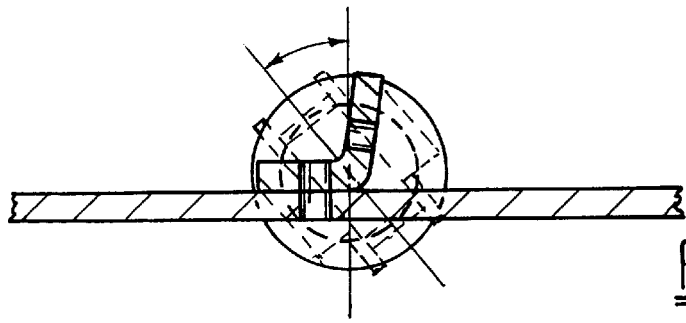
FIGS. 23A and 23B are sectional views of the brake beam strut of FIG. 20 attached to the compression member.
Figure 23B:
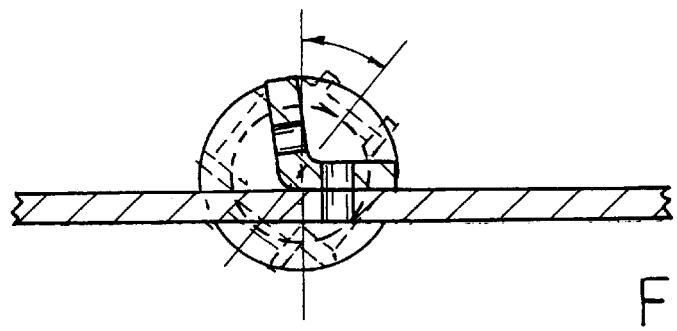

FIGS. 23A and 23B are sectional end views of strut 56, illustrating the relative positions of slot pairs 234/238 and 236/240 and legs 244 and 246.

Figure 24:
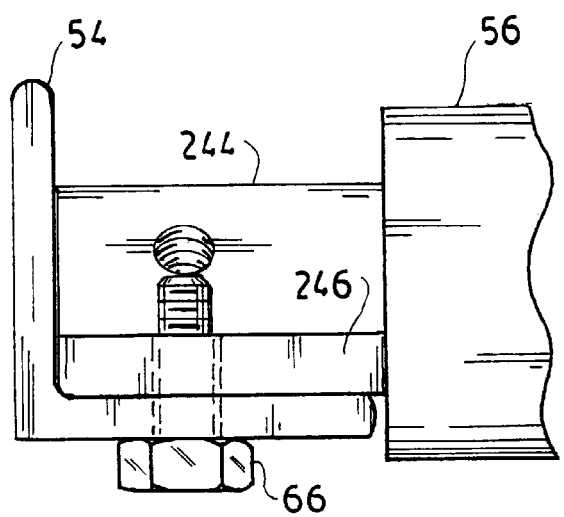
FIG. 24 a partial sectional view illustrating the brake beam strut of FIG. 20 attached to the compression member.

FIG. 24 is a partial sectional view illustrating the connection between tension member 54 and strut 56 with fastener 66. As will be apparent to those skilled in the art, fastener 66 is loaded in shear, thereby providing a simplified assembly.

Figure 25B:
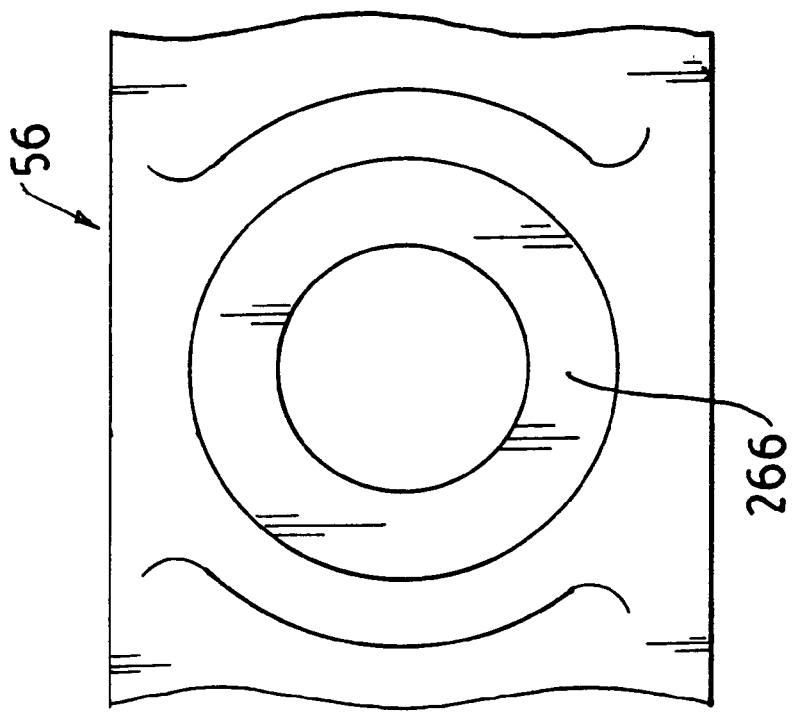
FIGS. 25A and 25B are side views of a strut bushing assembled into the brake beam strut.
Figure 25A:
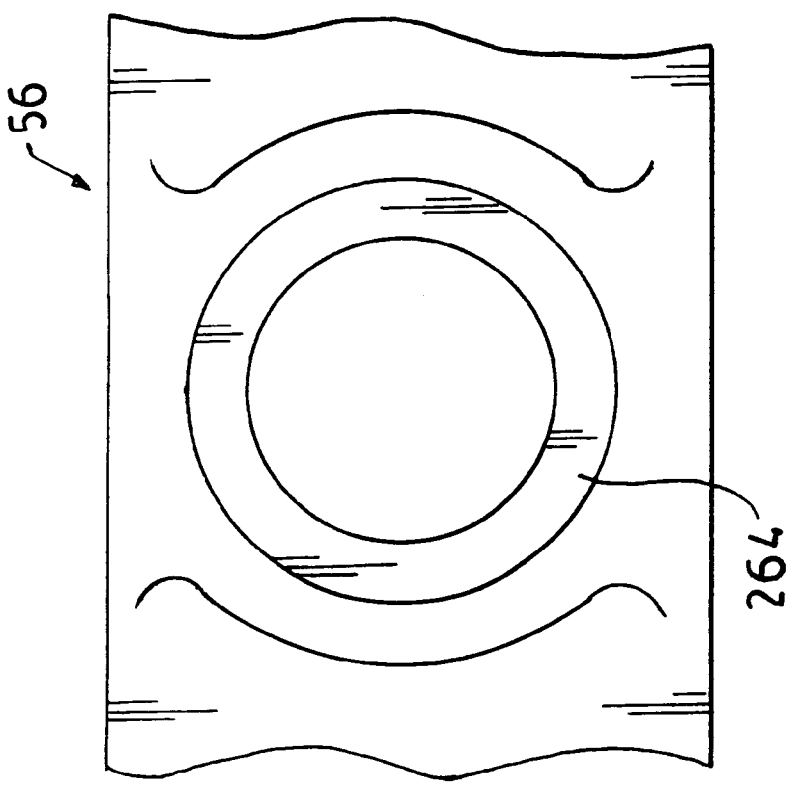

FIGS. 25A and 25B are partial side views of strut 56. It will be seen that strut 56 is adapted to receive either bushing 264 and bushing 266. The outside diameter of both of these bushings is identical, but the inside diameters are varied. Thus, with the use of one strut 56 with only one strut pinhole 80, bushings with different inside diameters can be used. As will be apparent to those in the art, different bushings are used to control the application of different capacity beams in brake systems.

FIG. 26A is a tension member 52 prior to the time any other components have been attached to it. In the assembly step illustrated in FIG. 26B, tension member 52 is inserted into brake heads 58 and 60 which are located at controlled positions 268 and 270.

Figure 26C:
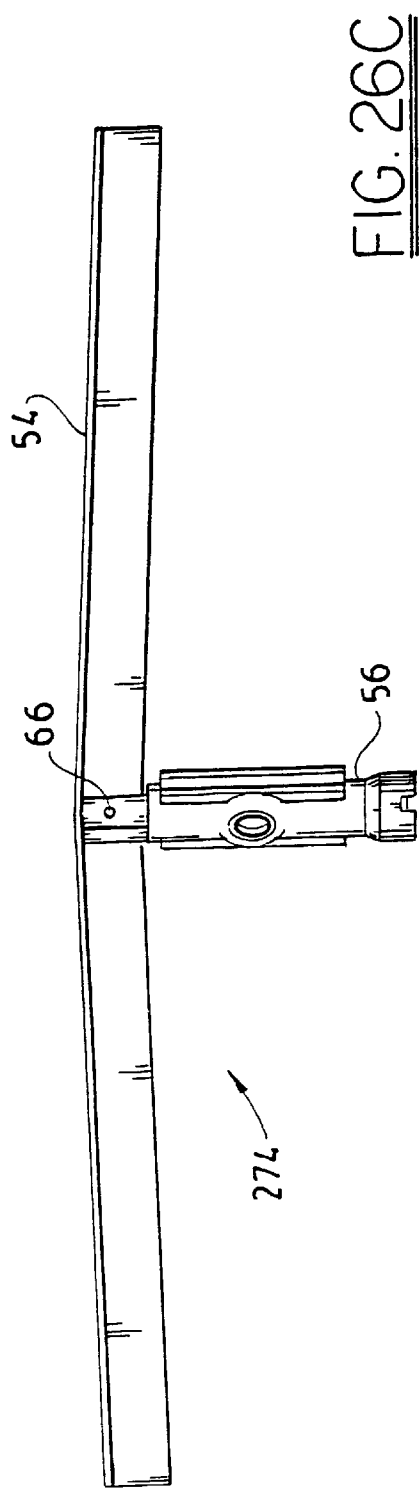

In the assembly step illustrated in FIG. 26C, a subassembly 274 is constructed by joining strut 56 to compression member 54 by means of fastener 66.

Figure 26D:
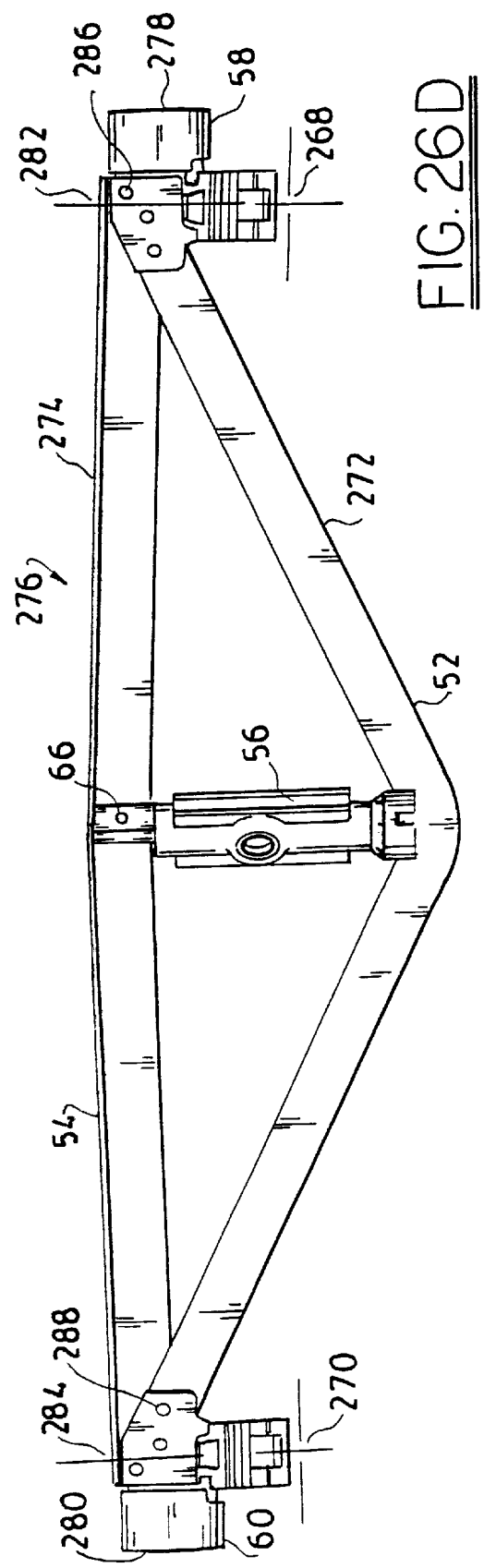

In the assembly step illustrated in FIG. 26D, subassembllies 272 and 274 are joined by inserting subassembly 274 into subassembly 272, thereby producing new subassembly 276. Thereafter, at points 278 and 280, forces are sequentially applied by means of clamps (or other suitable means) to cause contact between surface 168 at the end of compression member 54, and surface 184 on brake head 60 (see FIG. 12). As will be apparent to those skilled in the art, because of the symmetry of the beam, a similar effect occurs at the interface between brake head 58, and the compression member 54. Subsequently, and similarly, forces are then applied at points 282 and 284 to compress the ends of bar 52 between compression member 54 and brake heads 58 and 60.

The compressed assembly thus produced is identified as subassembly 276. Thereafter, holes 286 and 288 are drilled in the assembly to receive fasteners (not shown).

Figure 27:
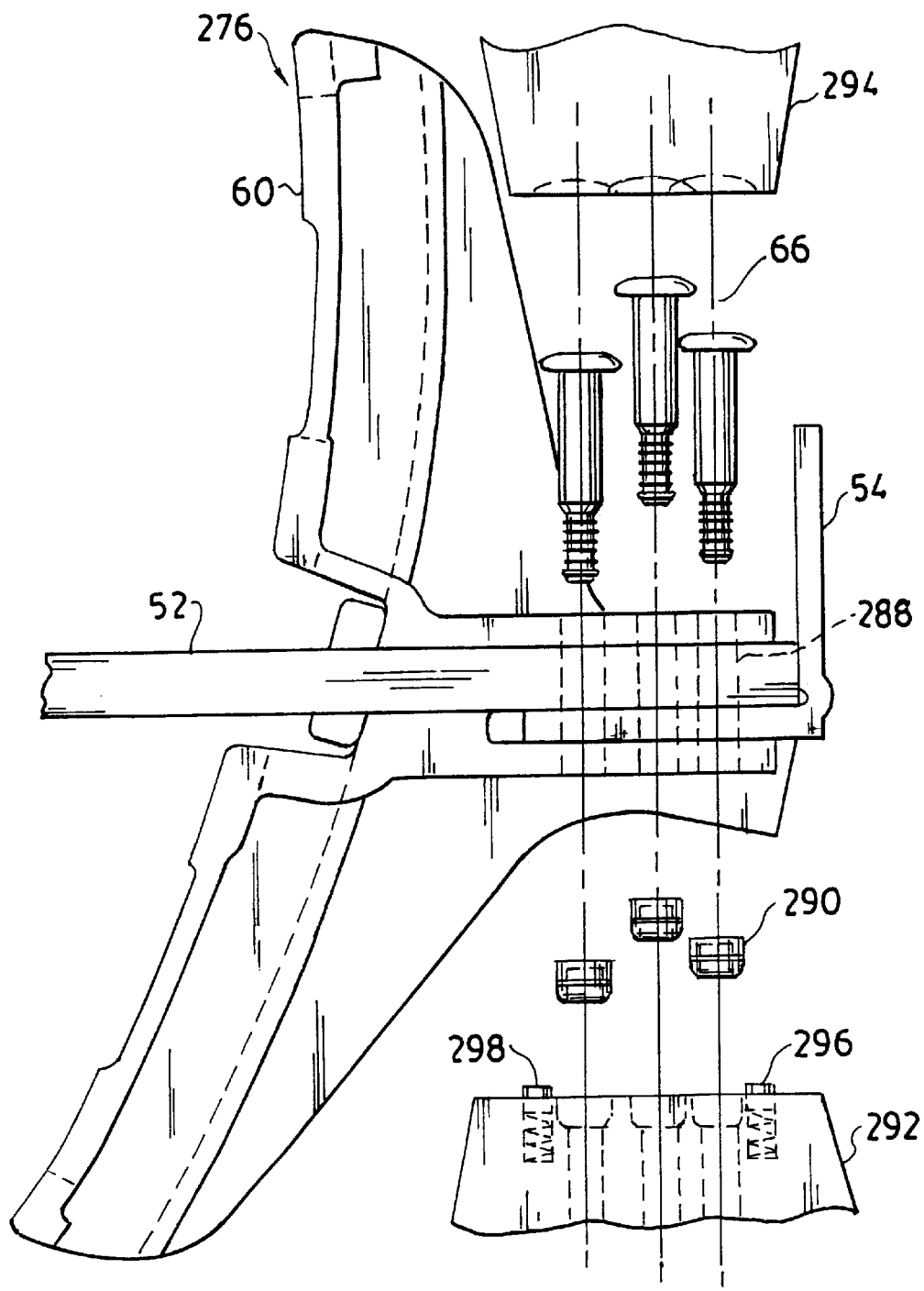
FIG. 27 an exploded view of the preferred brake beam assembly hardware, illustrating how it is configured.

FIG. 27 is a partial exploded view of subassembly 276. Fasteners 66 are preferably inserted through holes 286 and 288 and secured with fasteners collars 290.

In the preferred process illustrated in FIG. 27, lower and upper mandrels 292 and 294 are used to force collars 290 onto the fasteners 66 and to swage them into final fastening position. It will be noted that lower mandrel 292 preferably contains preloading springs 296 and 298 adapted to clamp the beam assembly 276 prior to swaging collars 290.

FIGS. 28A, 28B, and 28C illustrates a two piece rivet 300 which can be used which is comprised of a pin 302 and a collar 304. FIGS. 29A and 29B illustrate an bolt 308/nut 310 fastener. FIG. 30 illustrates a solid integral rivet 312 which also may be used. A welded joint (not shown) also may be used.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. A brake beam assembly comprised of a compression member with a first end and a second end, a tension member with a third end and a fourth end, a strut connected to said tension member and said compression member, a first brake head with a first recess, a second brake head with a second recess, wherein:

(a) said first end and said second end of said compression member and said third end and said fourth end of said tension member are each comprised of a first hole, a second hole, and a third hole extending completely through said end;

(b) said first end of said compression member and said third end of said tension member are disposed within said first recess, and said second end of said compression member and said fourth end of said tension member are disposed within said second recess;

(c) disposed within each of said first hole is a first fastener, disposed within each of said second hole is a second fastener, and disposed within each of said third hole is a third fastener, wherein each of said first fastener, said second fastener, and said third fastener is disposed substantially perpendicularly to said compression member and said tension member;

(d) disposed within said first recess is said third end of said tension member, said first end of said compression member, and a first fastener, provided that no other structural member is disposed within said recess; and (e) disposed within said second recess is said fourth end of said tension member, said second end of said compression member, and a first fastener, provided that no other structural member is disposed within said recess, (f) said tension member is comprised of a first side surface and a second side surface, (g) said first side surface of said tension member is contiguous with said first brake head, (h) said second side surface of said tension member is contiguous with said second brake head, (i) said tension member:
  1. has a cross-sectional area of from about 0.5 to about 5.0 square inches,
  2. has a yield strength of from about 20,000 to about 100,000 pounds per square inch,
  3. consists essentially of carbon steel with a carbon content of from about 0.05 to about 0.8 percent,
  4. has a depth of from about 5 to about 17 inches,
  5. is comprised of a first leg and a second leg integrally joined to each other which form an angle therebetween of at least about 105 degrees, (j) said compression member:
  1. has a thickness of from about 0.1 to about 0.5 inches,
  2. has a yield strength of from about 20,000 to about 100,000 pounds per square inch,
  3. consists essentially of carbon steel with a carbon content of from about 0.05 to about 0.8 percent, and
  4. has an overall length of from about 50 to about 70 inches.

2. The brake beam assembly as recited in claim 1, wherein said third hole is not colinear with said second hole and said first hole.

3. A brake beam assembly comprised of a compression member with a first end and a second end, a tension member with a third end and a fourth end, a strut connected to said tension member and said compression member, a first brake head with a first recess, a second brake head with a second recess, wherein:

(a) said first end and said second end of said compression member and said third end and said fourth end of said tension member are each comprised of a first hole and a second hole;

(b) said first end of said compression member and said third end of said tension member are disposed within said first recess, and said second end of said compression member and said fourth end of said tension member are disposed within said second recess;

(c) disposed within each of said first hole is a first fastener, and disposed within each of said second hole is a second fastener, wherein each of said first fastener and said second fastener is disposed substantially perpendicularly to said compression member and said tension member;

(d) disposed within said first recess is said third end of said tension member, said first end of said compression member, and a first fastener, provided that no other structural member is disposed within said recess; and (e) disposed within said second recess is said fourth end of said tension member, said second end of said compression member, and a first fastener, provided that no other structural member is disposed within said recess, (f) said tension member is comprised of a first side surface and a second side surface, (g) said first side surface of said tension member is contiguous with said first brake head, (h) said second side surface of said tension member is contiguous with said second brake head, (i) said tension member:
  1. has a cross-sectional area of from about 0.5 to about 5.0 square inches,
  2. has a yield strength of from about 20,000 to about 100,000 pounds per square inch,
  3. consists essentially of carbon steel with a carbon content of from about 0.05 to about 0.8 percent,
  4. has a depth of from about 5 to about 17 inches,
  5. is comprised of a first leg and a second leg integrally joined to each other which form an angle therebetween of at least about 105 degrees, (j) said compression member:
  1. has a thickness of from about 0.1 to about 0.5 inches,
  2. has a yield strength of from about 20,000 to about 100,000 pounds per square inch,
  3. consists essentially of carbon steel with a carbon content of from about 0.05 to about 0.8 percent, and
  4. has an overall length of from about 50 to about 70 inches.

4. The brake beam assembly as recited in claim 3, wherein said tension member has an upper surface and a lower surface which are substantially parallel to each other.

5. The brake beam assembly as recited in claim 3, wherein said tension member is comprised of a first parallel wall and a second parallel wall which extend from a middle section to a first end section and a second end section, provided that, when said first parallel wall and said second parallel wall extend past said section towards said first end section and said second end section, they are substantially straight without any bends.

6. The brake beam assembly as recited in claim 4, wherein each of said third and fourth ends of said tension member is substantially contiguous with said first and second ends of said compression member, respectively.

* * * * *